US012521744B2

(12) United States Patent
Youdovin et al.

(10) Patent No.: US 12,521,744 B2
(45) Date of Patent: Jan. 13, 2026

(54) CONCENTRATED CLEANING POD, DISPENSER, AND RETAINING-EJECTING MECHANISM FOR DISPENSING CLEANING SOLUTION THEREFROM

(71) Applicant: Everybody Cleanup, P.B.C., New York, NY (US)

(72) Inventors: David N. Youdovin, New York, NY (US); Karl Winkler, New York, NY (US); David Wolbert, New York, NY (US)

(73) Assignee: Everybody Cleanup, P.B.C., New York, NY (US)

(*) Notice: Subject to any disclaimer, the term of this patent is extended or adjusted under 35 U.S.C. 154(b) by 137 days.

(21) Appl. No.: 18/535,240

(22) Filed: Dec. 11, 2023

(65) Prior Publication Data

US 2024/0100552 A1 Mar. 28, 2024

Related U.S. Application Data

(63) Continuation-in-part of application No. 18/481,354, filed on Oct. 5, 2023, now Pat. No. 12,280,387, and (Continued)

(51) Int. Cl.
*B05B 11/00* (2023.01)
*B05B 11/06* (2006.01)

(52) U.S. Cl.
CPC ...... *B05B 11/0054* (2013.01); *B05B 11/0078* (2013.01); *B05B 11/06* (2013.01)

(58) Field of Classification Search
CPC . B05B 11/0054; B05B 11/0078; B05B 11/06; B05B 11/0097; B05B 11/1011; B05B 11/0081; B65D 51/2821
See application file for complete search history.

(56) References Cited

U.S. PATENT DOCUMENTS

| | | | | |
|---|---|---|---|---|
| 610,127 A * | 8/1898 | Durafort ............. | B67D 1/0412 222/399 |
| 629,752 A * | 7/1899 | Murray ................ | B67D 1/0456 261/DIG. 7 |

(Continued)

FOREIGN PATENT DOCUMENTS

| | | | |
|---|---|---|---|
| CH | 620987 A5 | 12/1980 |
| KR | 10-2005-0094277 | 9/2005 |
| WO | WO 00/26107 A1 | 5/2000 |

OTHER PUBLICATIONS

David N. Youdovin et al., U.S. Appl. No. 18/481,354 for "Cleaning Dispenser and Mounting Station", filed Oct. 5, 2023.

(Continued)

*Primary Examiner* — Bob Zadeh
(74) *Attorney, Agent, or Firm* — Alston & Bird LLP

(57) ABSTRACT

A container configured for dispensing a composite fluid is provided. The container includes a cover housing and base having reservoir therein. The cover housing includes a chamber including a recess configured for receiving a pod containing concentrated fluid at least partially therein and a dispensing mechanism. The reservoir is configured to contain a diluting fluid. The diluting fluid and the concentrated fluid are mixed to form a composite fluid that is dispensed via the dispensing mechanism. The composite fluid may be a cleaner, potable beverage, medicated fluid, and/or the like.

19 Claims, 29 Drawing Sheets

Related U.S. Application Data a continuation-in-part of application No. 17/813,697, filed on Jul. 20, 2022, now Pat. No. 11,890,628.

(56) References Cited

U.S. PATENT DOCUMENTS

| | | | | |
|---|---|---|---|---|
| 2,172,035 | A | 9/1939 | Roth | |
| 2,822,002 | A * | 2/1958 | Mack | B65D 83/64 222/399 |
| 3,937,367 | A | 2/1976 | Hood | |
| 4,174,056 | A | 11/1979 | Loeffler | |
| 4,473,174 | A * | 9/1984 | Heuser | B67D 1/0885 215/311 |
| 4,759,525 | A * | 7/1988 | Cross | B60N 3/103 248/346.11 |
| 5,323,935 | A | 6/1994 | Gosselin et al. | |
| 5,368,203 | A * | 11/1994 | Friedrich | A47J 47/04 211/DIG. 1 |
| 5,388,766 | A | 2/1995 | Buisson | |
| 5,964,377 | A | 10/1999 | Demarest et al. | |
| 6,155,459 | A | 12/2000 | Bunschoten et al. | |
| 6,244,469 | B1 | 6/2001 | Knickerbocker | |
| 6,253,961 | B1 | 7/2001 | Anderson et al. | |
| 7,040,510 | B1 | 5/2006 | Hester | |
| 7,051,907 | B2 | 5/2006 | Brincat | |
| 9,987,645 | B2 | 6/2018 | Richman et al. | |
| 10,682,658 | B1 | 6/2020 | Youdovin | |
| 10,766,045 | B1 | 9/2020 | Youdovin | |
| 10,925,458 | B2 | 2/2021 | Youdovin | |
| 11,359,952 | B2 | 6/2022 | Youdovin | |
| 2006/0196885 | A1 | 9/2006 | Leach et al. | |
| 2007/0246569 | A1 | 10/2007 | Tada | |
| 2008/0314928 | A1 | 12/2008 | Banco et al. | |
| 2009/0095822 | A1 | 4/2009 | Chen et al. | |
| 2009/0101680 | A1* | 4/2009 | Laws | B01F 35/7131 222/399 |
| 2011/0049193 | A1 | 3/2011 | Muller Kubold et al. | |
| 2014/0346193 | A1* | 11/2014 | Conway | B05B 11/1011 222/173 |
| 2015/0336785 | A1 | 11/2015 | Rege et al. | |
| 2015/0352571 | A1* | 12/2015 | Petkus | C11D 7/50 222/1 |
| 2017/0267510 | A1 | 9/2017 | Chapman et al. | |
| 2018/0133724 | A1 | 5/2018 | Fabrizio | |
| 2020/0094287 | A1 | 3/2020 | Loza et al. | |
| 2024/0100552 | A1* | 3/2024 | Youdovin | B05B 11/0081 |

OTHER PUBLICATIONS

International Search Report and Written Opinion received for International Patent Application No. PCT/US2023/020198, mailed on Aug. 23, 2023, 12 pages.

* cited by examiner

CONCENTRATED CLEANING POD, DISPENSER, AND RETAINING-EJECTING MECHANISM FOR DISPENSING CLEANING SOLUTION THEREFROM

CROSS-REFERENCE TO RELATED APPLICATIONS

This application is a continuation-in-part of U.S. application Ser. No. 17/813,697, filed Jul. 20, 2022, and a continuation-in-part of U.S. application Ser. No. 18/481,354, filed Oct. 5, 2023, the contents of which are incorporated herein by reference in their entireties.

TECHNICAL FIELD

Various embodiments generally relate to a container for dispensing solutions and/or composite fluid, such as cleaning solutions, potable fluids, and/or the like. For example, various embodiments relate to containers configured to dispense composite fluids that decrease financial and carbon footprint costs of conventional products.

BACKGROUND

In general, a user may wish to have various cleaning solutions for cleaning different surfaces. For example, a user may wish to have a glass cleaning solution, a bath cleaning solution, a general-purpose kitchen cleaning solution, a metal cleaning solution, and/or the like. However, traditional cleaning arrangements require users to maintain and store separate reservoirs of cleaning solution corresponding to each desired cleaning solution. The user may not want or be able to dedicate enough safe storage space to accommodate a plurality of different reservoirs of cleaning solutions.

Moreover, traditional cleaning arrangements require that a user purchase a dispenser each time the user wishes to refill a cleaning product. This increases the financial and carbon footprint costs of cleaning products.

BRIEF SUMMARY

Example embodiments of the present invention provide a container configured to receive diluting fluid and concentrated fluid (e.g., via a pod containing concentrated fluid) and dispense a composite fluid that is a mixture of the diluting fluid and the concentrated fluid. In various embodiments, the composite fluid is one of a cleaning solution, a potable beverage, a cleaner configured for cleaning humans or other animals, or a medicated fluid. Some non-limiting examples of cleaning solutions include glass cleaning solution, bath cleaning solution, general purpose kitchen cleaning solution, metal cleaning solution, dish soap, laundry stain remover, scent neutralizing solution, air freshener, laundry detergent, cleaning powders, and/or the like. Some non-limiting examples of potable beverages include flavored beverages, beverages including electrolytes, alcoholic beverages, and/or the like. Some non-limiting examples of cleaners configured for cleaning humans or other animals include hand soap, bath soap or body wash, shampoo, conditioner, face wash, and/or the like. Some non-limiting examples of medicated fluid include anti-bacterial spray, anti-fungal spray, sunscreen, bug repellent, pesticide (e.g., flea and tick spray, etc.), and/or the like.

In various embodiments, the container is configured to receive within a recess thereof a pod storing concentrated fluid, mix at least a portion of the concentrated fluid with a diluting fluid to form the composite fluid, and dispense the composite fluid via a dispensing mechanism of the container. In various embodiments, the container comprises a base having a reservoir configured to receive and contain diluting fluid and a cover housing comprising a chamber configured to receive a pod containing concentrated fluid at least partially therein. The chamber includes a retaining-ejecting mechanism configured to maintain and/or release/eject the pod from the chamber, in an example embodiment. In various embodiments, the chamber includes a puncture tool configured to release at least a portion of the concentrated fluid from the pod. In various embodiments, the container includes a dispensing mechanism via which the composite fluid is dispensed. In an example embodiment, the container comprises a proportioning system that mixes the diluting fluid and the concentrated fluid on demand to provide a set amount of composite fluid.

According to an aspect of the present disclosure, a container is provided. The container is configured for dispensing a composite fluid. The container includes a cover housing and a base. The cover housing includes a chamber comprises a recess configured for receiving a pod at least partially therein, wherein the pod is configured to contain a concentrated fluid, and a retaining-ejecting mechanism. The retaining-ejecting mechanism includes at least one seal configured to engage the pod to prevent fluid from at least one of the pod or a base to exit the dispenser undesirably, and an insert guide configured to assist translation of the inserted pod along a unidirectional path in or out of the chamber. The retaining-ejecting mechanism enables the pod to be inserted into a retained position at least partially within the recess, retained in a retained position, and released from the retained position. The base at least partially defines a reservoir configured for receiving and maintaining a diluting fluid therein. The composite fluid is a mixture of the diluting fluid and the concentrated fluid. The cover housing is configured to be coupled to the base so as to enclose the reservoir. The container further includes a dispensing mechanism configured for selectively dispensing the composite fluid from the container.

In an example embodiment, the container further includes a fluid path between the recess and the reservoir configured to enable diluting fluid to flow through the recess into the reservoir.

In an example embodiment, the chamber further includes a pod opening mechanism configured to enable at least a portion of the concentrated fluid to flow out of the pod and into one of (a) the reservoir via a fluid path between the recess and the reservoir or (b) a proportioning chamber.

In an example embodiment, the diluting fluid and the concentrated fluid are mixed in the one of (a) the reservoir and the reservoir or (b) a proportioning chamber to form the composite fluid.

In an example embodiment, further includes a dispensing mechanism configured to dispense the composite fluid from the one of (a) the reservoir via a fluid path between the recess and the reservoir or (b) a proportioning chamber.

In an example embodiment, the dispensing mechanism is one of an atomizer, a foaming dispenser, a pump dispenser, a drip dispenser, a pour spout, or a suction-based dispenser.

In an example embodiment, the pod opening mechanism comprises one or more puncture tools configured to puncture a surface of the pod when the pod is engaged into the retained position.

In an example embodiment, the composite fluid is one of a cleaning solution, a potable beverage, a cleaner configured for cleaning humans or other animals, or a medicated fluid.

In an example embodiment, a fluid path between the recess and the reservoir is configured to enable diluting fluid to be provided to the reservoir via the recess without disassembly of the container.

In an example embodiment, the base comprises a window that enables a user to see when a level of diluting fluid within the reservoir reaches a fill level.

In an example embodiment, the retaining-ejecting mechanism includes a first seal and a second seal and, when the pod is in the retained position, the first seal is configured to engage the pod to hold the pod seated against the second seal.

In an example embodiment, the container further includes a proportioning system configured to suction or pump a controlled volume of concentrated fluid out of the pod.

In an example embodiment, the proportioning system is configured to mix the controlled volume of concentrated fluid with a controlled volume of diluting fluid to provide composite fluid on-demand of a set strength.

In an example embodiment, the container includes a user interface that enables a user to select a ratio of concentrated fluid to diluting fluid in the composite fluid.

In an example embodiment, the composite fluid is dispensed via the dispensing mechanism.

In an example embodiment, the container further includes a trigger mechanism, wherein the proportioning system is configured to suction or pump the controlled volume of concentrated fluid out of the pod in response to actuation of the trigger mechanism.

In an example embodiment, the diluting fluid is water.

In an example embodiment, the at least one seal is configured to engage the pod so as to retain the pod within the retained position via friction.

In an example embodiment, the container further includes comprising a compressed gas cartridge housing configured to have a compressed gas cartridge, wherein the container is configured such that when the composite fluid is dispensed from the container, gas from the compressed gas cartridge is dissolved in the composite fluid.

In an example embodiment, at least one of (a) the container is configured to be held in a human hand when dispensing the composite fluid, (b) the container is configured to rest on a horizontal surface when dispensing the composite fluid, or (c) the container is configured to be mounted to a vertical surface when dispensing the composite fluid.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated Like number refer to like elements throughout.

Various embodiments provide containers configured to dispense a composite fluid. The composite fluid is formed by mixing a concentrated fluid and a diluting fluid within the container. In various embodiments, the composite fluid is one of a cleaning solution, a potable beverage, a cleaner configured for cleaning humans or other animals, or a medicated fluid. Some non-limiting examples of cleaning solutions include glass cleaning solution, bath cleaning solution, general purpose kitchen cleaning solution, metal cleaning solution, dish soap, laundry stain remover, scent neutralizing solution, air freshener, laundry detergent, cleaning powders, and/or the like. Some non-limiting examples of potable beverages include flavored beverages, beverages including electrolytes, alcoholic beverages, and/or the like. Some non-limiting examples of cleaners configured for cleaning humans or other animals include hand soap, bath soap or body wash, shampoo, conditioner, face wash, and/or the like. Some non-limiting examples of medicated fluid include anti-bacterial spray, anti-fungal spray, sunscreen, bug repellent, pesticide (e.g., flea and tick spray, etc.), and/or the like.

In various embodiments, the concentrated fluid includes the active component(s) and/or ingredient(s) of the cleaning solution, cleaner configured for cleaning humans or other animals, or medicated fluid and the diluting fluid is a solvent or other fluid that can be mixed with the active component(s) and/or ingredient(s) to provide a composite fluid having an appropriate concentration of the active component(s) and/or ingredient(s). For example, the diluting fluid may be (tap) water, ionized water, deionized water, distilled water, rubbing alcohol, and/or the like. In various embodiments, the concentrated fluid includes flavoring, electrolytes, a measured amount of an alcoholic beverage, and/or the like and the diluting fluid is a potable fluid configured to be mixed with the concentrated fluid to provide a potable beverage. For example, the diluting fluid may be potable water, juice, tea, coffee, and/or other potable beverage.

Figure 1:
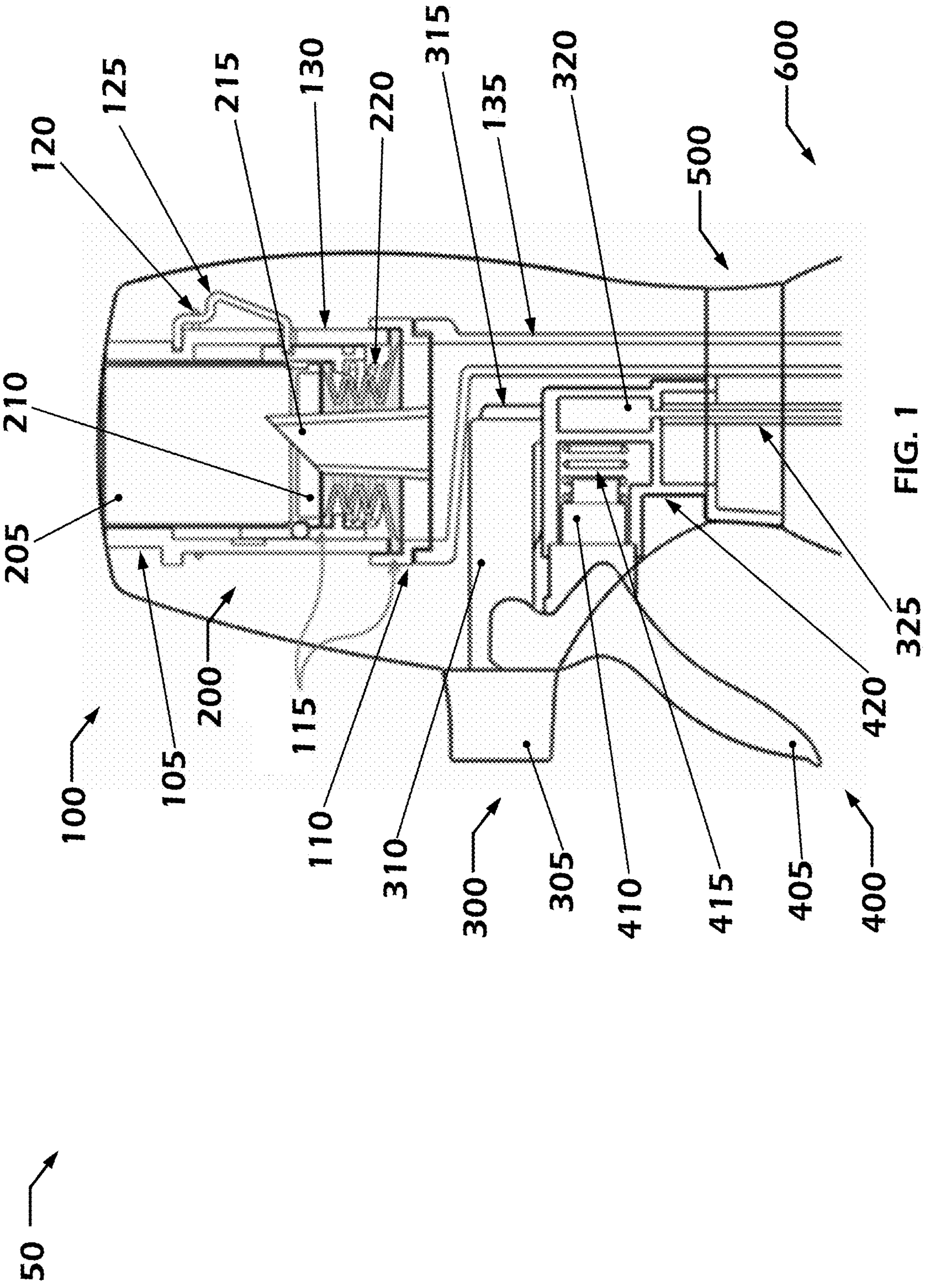
FIG. 1 illustrates a partial cross-sectional side view of a container in accordance with an example embodiment.
Figure 2:
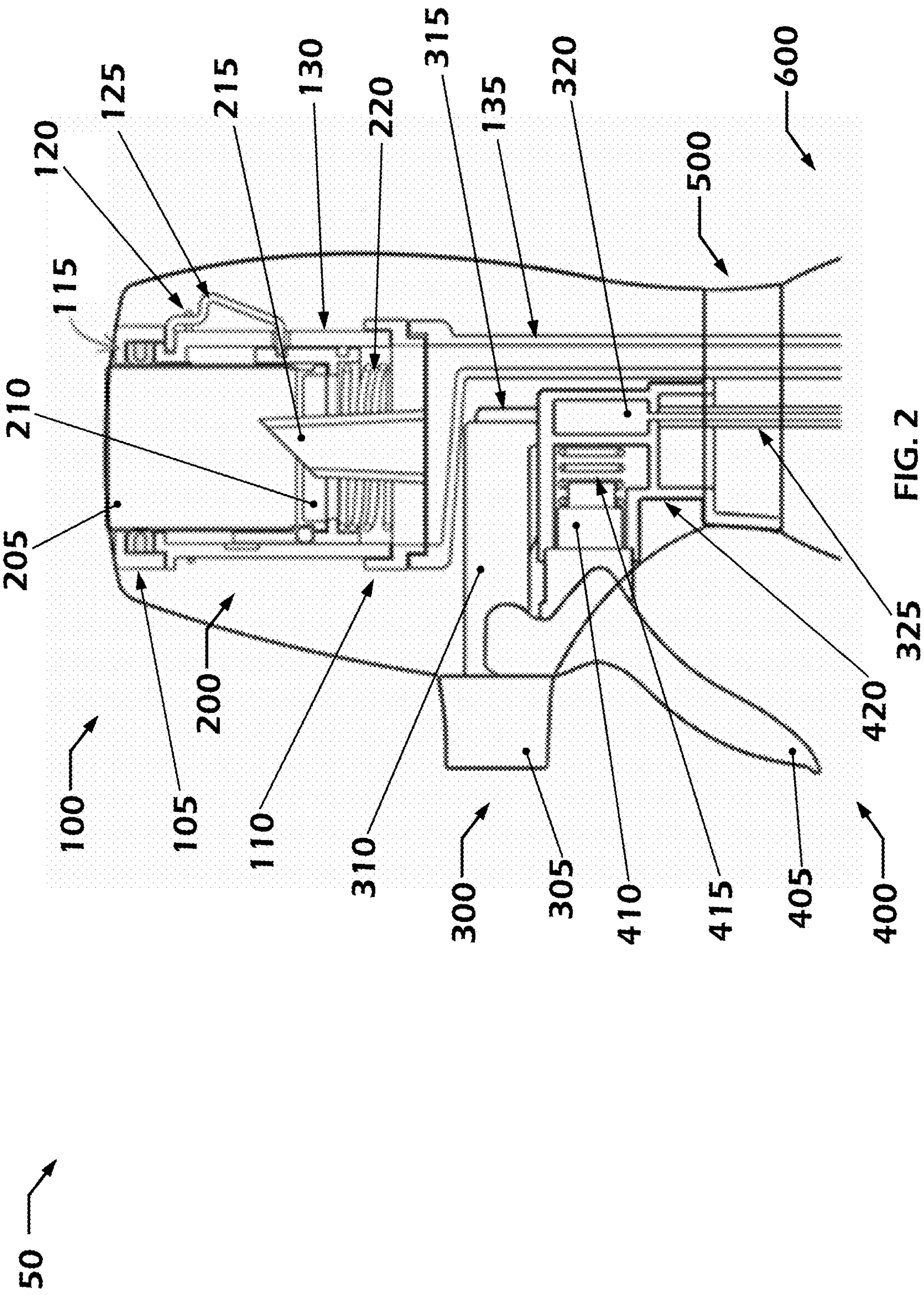
FIG. 2 illustrates a partial cross-sectional side view of a container in accordance with an example embodiment.

FIG. 1 and FIG. 2, each provide a partial cross-sectional side view of a respective container 50, according to various embodiments. The container 50 is configured to dispense a composite fluid formed by mixing a concentrated fluid provided via a pod 205 and a diluting fluid stored in a reservoir disposed within the base 600. For example, in various embodiments, the container 50 is a dispenser configured for the formation of a composite fluid therein and the dispensation of the composite fluid therefrom. In various embodiments, a container 50 comprises: a cover housing 100 which is selectively affixed and/or securable to a base 600 via at least one attachment mechanism 500. The at least one attachment mechanism 500 may be designed in a number of different configurations (e.g., threaded, push latch, snap fit, magnetic, etc.). The base 600 at least partially defines a reservoir configured for receiving and maintaining fluid therein.

In various embodiments, the container is configured to be a handheld container. In various embodiments, the container is configured to be a tabletop or countertop dispenser (e.g., configured to rest on a tabletop or countertop while dispensing composite fluid). In various embodiments, the container is configured to be wall-mounted.

The cover housing 100 is configured to be coupled to the base via the at least one attachment mechanism 500 so as to enclose the reservoir. The cover housing 100 structure includes a chamber 130, providing a recess configured for receiving a pod 205 at least partially therein. The cover housing 100 also includes a retaining-ejecting mechanism 200 corresponding to and/or coupled to the recess chamber 130. The retaining-ejecting mechanism 200 enables the pod 205 to be inserted into a retained position at least partially within the recess, retained in the retained position, and released from the retained position following designated user input. The pod 205 may be configured to contain a desired dosage of concentrated fluid. Though referred to as concentrated fluid herein, the concentrated fluid need not be a liquid. For example, the concentrated fluid may be any flowable material such as liquid, powder, flowable gel, and/or the like.

In various embodiments, a retaining-ejecting mechanism 200 may be incorporated into various containers and/or other dispensers. For example, a retaining-ejecting mechanism 200 may be incorporated into containers and/or dispensers similar to those disclosed by U.S. Pat. No. 10,682,658, issued Jun. 16, 2020, U.S. Pat. No. 10,766,045, issued Sep. 8, 2020, U.S. Pat. No. 11,359,952, issued Jun. 14, 2022, a floor cleaner similar to that disclosed by U.S. Pat. No. 10,925,458, issued Feb. 23, 2021, and/or other containers, dispensers, and/or cleaning devices. The contents of the noted patents are incorporated herein by reference in their entireties. For example, a retaining-ejecting mechanism 200 may be incorporated into the housing of various types of containers and/or dispensers such that the retaining-ejecting mechanism 200 may be used to receive a pod 205 containing a concentrated fluid and cause the concentrated fluid to be diluted (e.g., mixed with a diluting fluid) to provide a composite fluid.

Example Cover Housing

In an example embodiment, the cover housing 100 comprises a chamber 130. The chamber 130 comprises a recess, wherein the recess is configured to receive a pod 205 therein. The recess is defined by a lower chamber wall 110 and at least one sidewall 112.

In an example embodiment, the chamber 130 recess is defined, at least in part, by a lower chamber wall 110. The depth of lower chamber wall 110 from at least one surface of the cover housing is within a desired tolerance of the length of the pod 205.

Figure 6:
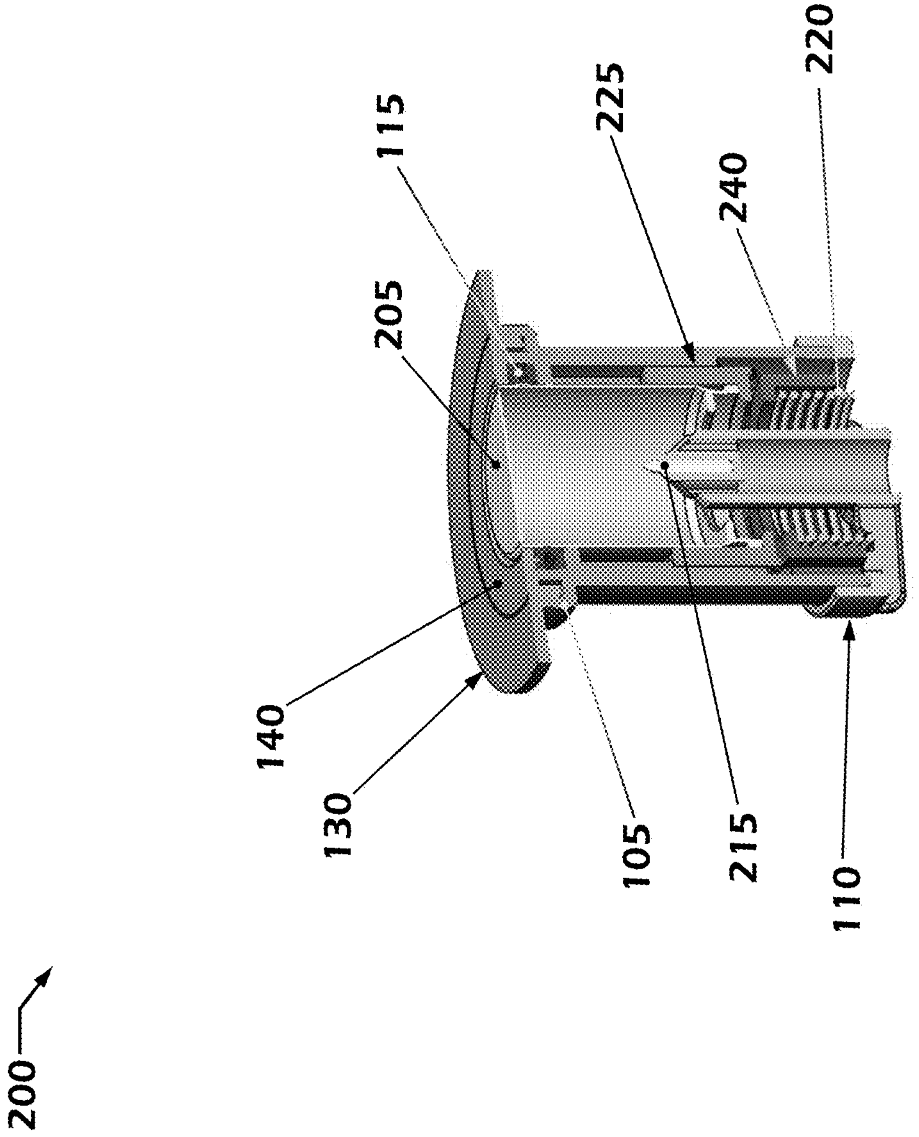
FIG. 6 illustrates a detailed cross-sectional isometric view of the retaining-ejecting mechanism in accordance with an example embodiment where the cleaning pod is pushed into the retained position of the retaining-ejecting mechanism.

In an example embodiment, the chamber 130 comprises at least one sidewall 112 and the lower chamber wall 110. The height of the at least one sidewall 112 is configured such that when the pod 205 is in the retained position, a surface of the pod 205 is generally flush with a surface of the cover housing 100 (as shown in FIG. 6).

Example Cleaning Pod

In an example embodiment, the pod 205 is configured with at least three sides to form an internal volume. The internal volume is filled with a concentrated cleaning medium, designed to be released into a fluid to be decon-centrated and/or diluted. To do so, a puncture location 210 is configured in the design of the pod 205. The puncture location 210 may be designed in a number of different configurations (metallic foil, elastomeric polymer membrane, etc.) to provide puncturing of the pod 205 after being depressed into the retaining-ejecting mechanism 200. A puncture tool 215 is located at the lower chamber wall 110 in an orientation configured to puncture a portion of the pod 205. The puncture tool 215 may be designed in a number of different configurations (e.g., needle, sharp, blunt, or tapered edge, etc.).

Exemplary Puncture Tool

In an example embodiment, a puncture tool 215 is integrated within the design of the lower chamber wall 110.

In an example embodiment, a puncture tool 215 is attached separately to the structure of the lower chamber wall 110.

In various embodiments, the puncture tool 215 is configured to puncture a surface of a pod 205 that is being inserted into the retained position within the chamber 130. In an example embodiment, the puncture tool 215 is at least partially hollow such that fluid from within the pod 205 may flow through at least a portion of the puncture tool 215 to flow into the container reservoir 650 (see FIG. 16).

Example Fluid Seal

The pod 205 may be configured with a puncture location 210 to release the contained concentrated powder or fluid. The puncture location 210 may be designed in a number of different configurations (e.g., metallic foil, elastomeric polymer membrane, etc.) to provide puncturing of the pod 205 after and/or as part of being pressed into the chamber 130 and being engaged into the retained position by the retaining-ejecting mechanism 200. A puncture tool 215 is located at the lower chamber wall 110 in an orientation configured to puncture a portion of the pod 205. The puncture tool 215 may be designed in a number of different configurations (e.g., needle, sharp, blunt, or tapered edge, etc.). In this design example, it can also be noted that the puncture tool 215 may be integrated within the design of the lower chamber wall 110 or attached separately therein.

In an example embodiment, at least one mechanical connection between the chamber 130 and the pod 205 is lined with a fluid seal 115. The seal functionally prevents fluid from passing in or out of the reservoir 650.

In an example embodiment, a chamber wall 105 is integrated within the structure of the cover housing 100 to support the fluid seal 115 in a fixed location. This chamber wall 105 is coupled with a seal barrier 140 that contains the fluid seal 115 in the fixed location in the scenario the chamber wall 105 structure is open to the top of the chamber 130. The seal barrier 140 also provides a direct contact patch between the connection of the chamber 130 and the pod 205 to ensure an adequate seal is provided.

In an example embodiment, the seal 115 is a bellows seal, an example of which is illustrated in FIG. 1. In an example embodiment, the seal 115 is an O-ring or gasket seal configured to engage with the walls of a pod 205, as shown in FIG. 2.

Example Retaining-Ejecting Mechanism

In an example embodiment, a retaining-ejecting mechanism 200 comprises at least one spring 220, an insert guide 225, a clip 125, a retainer 120, and a roller stop 230. The retaining-ejecting mechanism 200 enables the pod 205 to be inserted into a retained position at least partially within the recess, retained in the retained position, and released from the retained position following designated user input.

In various embodiments, the retaining-ejecting mechanism 200 is configured to retain the pod 205 in a retained position. For example, in an example embodiment, the pod 205 is secured within the chamber 130 via a friction fit with the fluid seal 115. In another example embodiment, the retaining-ejecting mechanism 200 includes one or more mechanical components that snap into place to retain the pod 205 in the retained position. In another example embodiment, the retaining-ejecting mechanism includes one or more active locking components that are engaged when the pod is pushed into place.

In an example embodiment, a retaining-ejecting mechanism 200 comprises at least one spring 220, an insert guide 225, and a spring retainer 240. The retaining-ejecting mechanism 200 enables the pod 205 to be inserted into a retained position at least partially within the recess, retained in the retained position, and released from the retained position. In an example embodiment, the clip 125 is configured such at least one protrusion of the clip 125 fits into at least one cavity in the insert guide 225 and at least one cavity in the structure of the chamber 130 wall. The retainer 120 retains the position of the clip 125 and position of the insert guide 225, wherein the position of the insert guide 225 provides a known location of at least an empty position, loaded position, punctured position, retained position, and released position. The retainer 120 may be removed and/or relocated to allow movement of the clip 125 from the insert guide 225, wherein the insert guide 225 may be translated unidirectionally between one or more positions of the plurality of known locations.

Example Dispensing Mechanism

In an example embodiment, a dispensing mechanism 300 comprises, a nozzle 305, an atomization area 310, a flow channel 315, a holding area 320, and a dispensing pipette 325. The dispensing mechanism 300 directs flow of the composite fluid from the reservoir 650 out of the nozzle 305.

In various embodiments, as shown in various figures, the composite fluid may be dispensed from the container via a dispensing mechanism including one of an atomizer, a pump dispenser, a foaming dispenser, a drip dispenser, a pour spout, a suction-based dispenser (e.g., a straw), and/or the like.

In various embodiments, the container is configured to have a brush or other tool attach to the dispensing mechanism. For example, a brush may snap on and/or friction fit around the nozzle of the container such that composite fluid may be dispensed and then scrubbed with the brush or other tool to perform a cleaning of a receiving surface.

In various embodiments, the dispensing mechanism may be user powered (e.g., a user pumping a trigger mechanism, sucking a straw, pouring the composite fluid, activating a hand pump, and/or the like). In an example embodiment, the dispensing mechanism is a powered dispensing mechanism.

Example Trigger Mechanism

In an example embodiment, a trigger mechanism comprises, a trigger handle 405, a plunger mechanism 410, a trigger spring 415, and a trigger structure 420. The trigger mechanism 400 generates a force (e.g., pressure differential, vacuum, or the like) to pull the cleaning solution into a holding area 320 upon release of the trigger handle 405 and an opposing force to dispense the cleaning solution from the holding area 320 when the trigger handle 405 in pressed. The releasing of the trigger handle 405 primes the holding area 320 with cleaning solution for the next activation of the trigger handle 405. A trigger spring 415 provides a constant tension or compression force against the plunger mechanism 410 in mechanical connection to the trigger. The trigger mechanism 400 is supported by the trigger structure 420, which may also be configured within the design of the cover housing 100.

Example Drain Channel

In an example embodiment, A lower chamber wall 110 exists at the bottommost surface of the chamber 130. Beneath the lower chamber wall 110, at least one drain channel 135 exists to direct flow of the pod 205 medium into the base 600 reservoir to be mixed as a cleaning solution.

In an example embodiment, the drain channel is part of the puncture tool 215. For example, the puncture tool 215 may be at least partially hollow such that pod medium may flow through the hollow portion of the puncture tool 215 from the interior of the pod 205 into the base reservoir.

In an example embodiment, the drain channel is a pipette or other opening in the lower chamber wall 110 configured to enable pod medium exiting the pod 205 that was punctured by the puncture tool 215 to flow into the base reservoir.

Example Container Dispensing Functionality

In an example embodiment, a pod 205 containing a concentrated fluid is inserted into the pod chamber 130 of the cover housing 100. The pod 205 is then pressed into the retained position of the retaining-ejecting mechanism 200 by the user to retain the pod 205 in the cover housing 100, and thus releasing at least a portion of the concentrated fluid from the pod 205 into the reservoir 650 disposed within the base 600. Next, the container 50 is shaken to cause the concentrated fluid to be mixed with the diluting fluid within the reservoir 650 to from the composite fluid. The trigger mechanism 400 can then be activated to dispense the composite fluid from the base 600 reservoir and out of the dispensing mechanism 300. After the dosage of contents of the base 600 reservoir have been expelled for the cleaning operation, the pod 205 can be removed and properly disposed. Finally, the container 50 cover housing 100 and base 600 reservoir can be rinsed before storing for the next use.

Additional Example Embodiments

In an example embodiment of FIG. 1, the container comprises a cover housing, a retaining-ejecting mechanism, a dispensing mechanism, a trigger mechanism, an attachment mechanism, and a base. A pod 205 containing a concentrated fluid is inserted into the chamber 130 of the cover housing 100 and depressed into the retained position of the retaining-ejecting mechanism 200. The puncture tool 215 is protrudes into the puncture membrane (e.g., dispensing surface 206) at the puncture location 210 of the pod 205. The fluid seal 115 is a bellows seal. The fluid seal 115 prevents fluid from leaking in and/or out of the base 600 reservoir. The concentrated fluid is transferred from the pod 205 to the base 600 reservoir via at least one drain channel 135.

In an example embodiment of FIG. 2, the container comprises a cover housing, a retaining-ejecting mechanism, a dispensing mechanism, a trigger mechanism, an attachment mechanism, and a base. A pod 205 containing concentrated fluid is inserted into the chamber 130 of the cover housing 100 and depressed into the retained position of the retaining-ejecting mechanism 200. The puncture tool 215 is protruding into the puncture membrane at the puncture location 210 of the pod 205. The fluid seal 115 is a wipe seal. The fluid seal 115 prevents fluid from leaking in and/or out of the base 600 reservoir. The concentrated fluid is transferred from the pod 205 to the base 600 reservoir 650 via at least one drain channel 135.

In various embodiments, the cover housing 100 further comprises a dispensing mechanism 300. The dispensing mechanism 300 may be designed in a number of different configurations (e.g., atomizer, pump dispenser, pour spout, a foaming dispenser, a suction-based dispenser (e.g., a straw), and/or the like), in various embodiments. In the example embodiment, illustrated in FIG. 1, the dispensing mechanism 300 is an atomizer. For example, an atomization area 310 may be configured in the design of the cover housing 100 to provide a desired air to composite fluid ratio or normal flow to a spout in an embodiment where the dispensing mechanism 300 is a pump dispenser. The nozzle 305 may be attached to the cover housing 100 via an outlet of the atomization area 310. The outlet may be designed in a number of different configurations (e.g., threaded tube, push latch, snap fit, etc.). The nozzle 305 may also be configured to provide different levels of projection or spray pattern of the composite solution as desired.

At the opposing end of the atomization area 310 from the nozzle 305, a flow channel 315 may provide a direction of flow of the composite fluid from the base 600 reservoir to the dispensing mechanism 300. The composite fluid may be extracted from the base 600 via a dispensing pipette 325 and trigger mechanism 400. The trigger mechanism 400 generates a force (e.g., pressure differential, vacuum, or the like) to pull the composite fluid into a holding area 320 upon release of the trigger handle 405 and an opposing force to dispense the composite fluid from the holding area 320 when the trigger handle 405 in pressed. The releasing of the trigger handle 405 primes the holding area 320 with composite fluid for the next activation of the trigger handle 405. A trigger spring 415 provides a constant tension or compression force against the plunger mechanism 410 in mechanical connection to the trigger. The trigger mechanism 400 is supported by the trigger structure 420, which may also be configured within the design of the cover housing 100.

Figure 3:
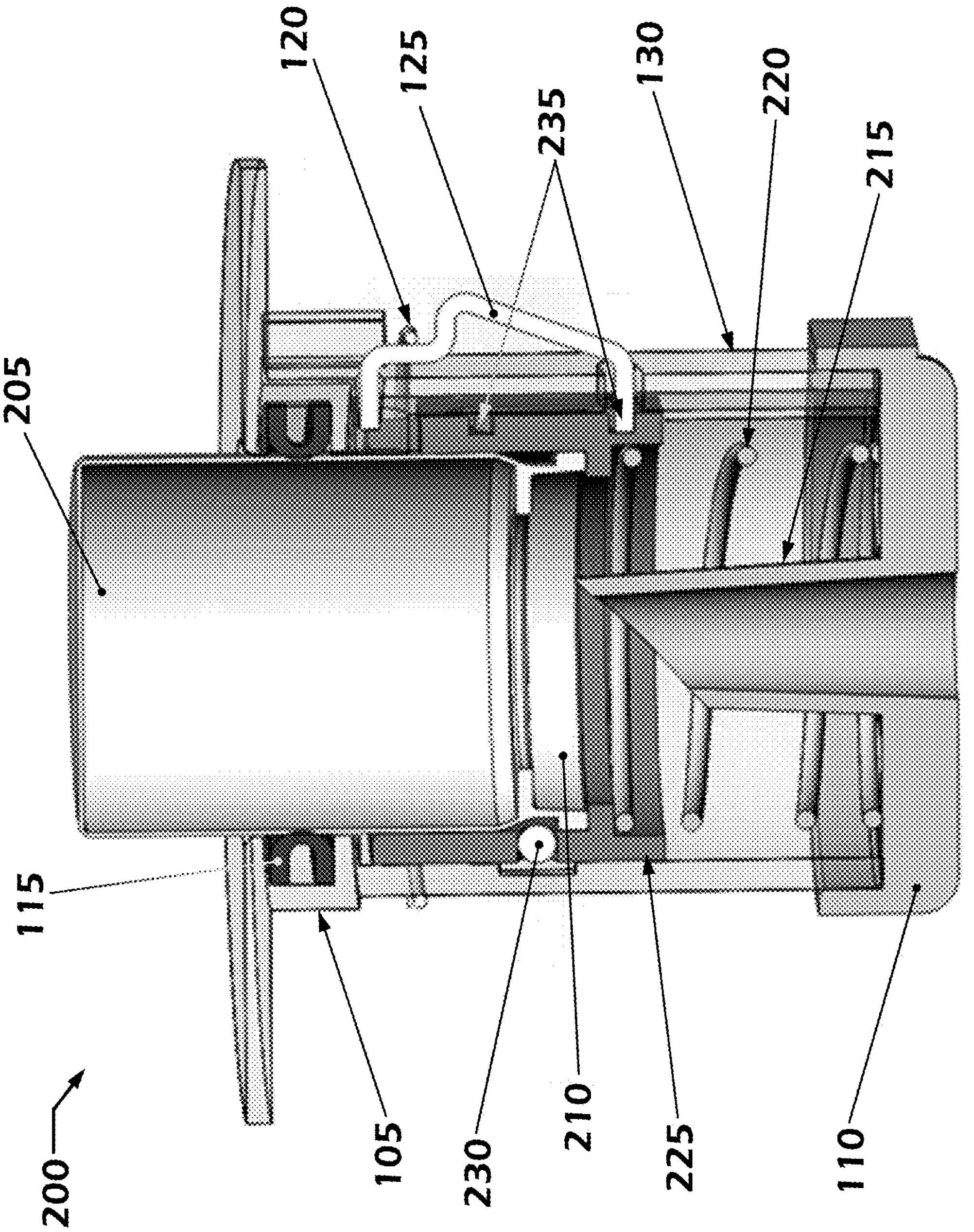
FIG. 3 illustrates a detailed and enlarged cross-sectional side view of the retaining-ejecting mechanism of the example embodiment shown in FIG. 2.

FIG. 3 provides a partial cross-sectional side view of the retaining-ejection mechanism of the example embodiment shown in FIG. 2 in a cross-sectional side view, according to various embodiments. In various embodiments, a container 50 comprises the chamber 130 of the cover housing 100 to provide a recess configured for receiving a pod 205 at least partially therein. The pod 205 rests on the insert guide 225 within the chamber 130. The insert guide 225 may slide in a unidirectional path to direct the pod 205 in or out of the chamber 130. A spring 220 provides a tensile or compression force between the insert guide 225 and the lower chamber wall 110. A roller stop 230 prevents the spring 220 from overextending or over compressing the insert guide 225 in the chamber 130. At least one insert guide stop marker 235 may exist or be integrated within the design of the insert guide 225 to provide one or more known positions of the insert guide 225.

A clip 125 resides in one or more of the at least one insert guide stop marker 235, which implements the retaining-ejecting mechanism 200. The clip 125 may be moved outward by user input (e.g., direct contact, relocated mechanism, electromechanical button assembly, etc.) and thus away from the at least one insert guide stop marker 235 to allow movement of the insert guide 225. A retainer 120 applies constant force against the outward direction of the clip 125 to retain the insert guide 225 in at least one of the one or more known positions when motion is undesired.

The pod 205 may be configured with a puncture location 210 to release the contained concentrated powder or fluid. The puncture location 210 may be designed in a number of different configurations (e.g., metallic foil, elastomeric polymer membrane, etc.) to provide puncturing of the pod 205 after being depressed into the retaining-ejecting mechanism 200. A puncture tool 215 is located at the lower chamber wall 110 in an orientation configured to puncture a portion of the pod 205. The puncture tool 215 may be designed in a number of different configurations (e.g., needle, sharp, blunt, or tapered edge, etc.). In this design example, it can also be noted that the puncture tool 215 may be integrated within the design of the lower chamber wall 110 or attached separately therein. At least one fluid seal 115 is integrated within the chamber wall 105 to prevent spillage of the pod 205 or base 600 reservoir. The fluid seal 115 may be designed in a number of different configurations or combinations thereof (e.g., wipe seal, O-ring/gasket seal, bellows seal, etc.).

FIG. 4, FIG. 5, FIG. 6, and FIG. 7, each illustrate different steps in a cycle of receiving, retaining, and ejecting a pod 205 of the retaining-ejecting mechanism 200. In this example embodiment, a spring retainer 240 is included to provide the unidirectional motion of the insert guide 225 through the chamber 130. A seal barrier 140 is also included to provide a direct contact patch between the connection of the chamber 130 and the pod 205 to ensure an adequate seal is provided. This seal barrier 140 is useful in the scenario the chamber wall 105 structure is open to the top of the chamber 130.

Figure 4:
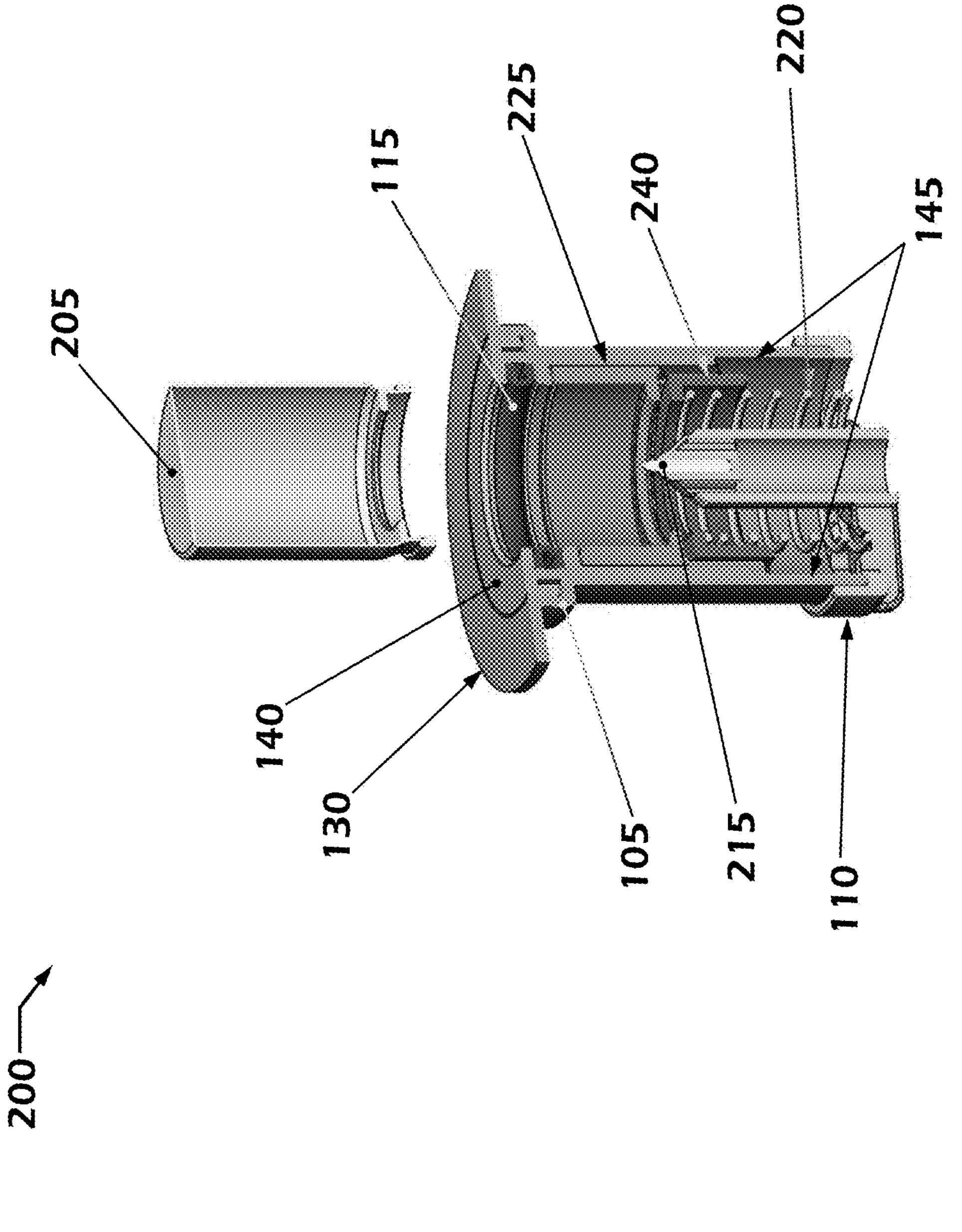
FIG. 4 illustrates a detailed cross-sectional isometric view of the retaining-ejecting mechanism in accordance with an example embodiment where the cleaning pod is removed from the chamber.
Figure 5:
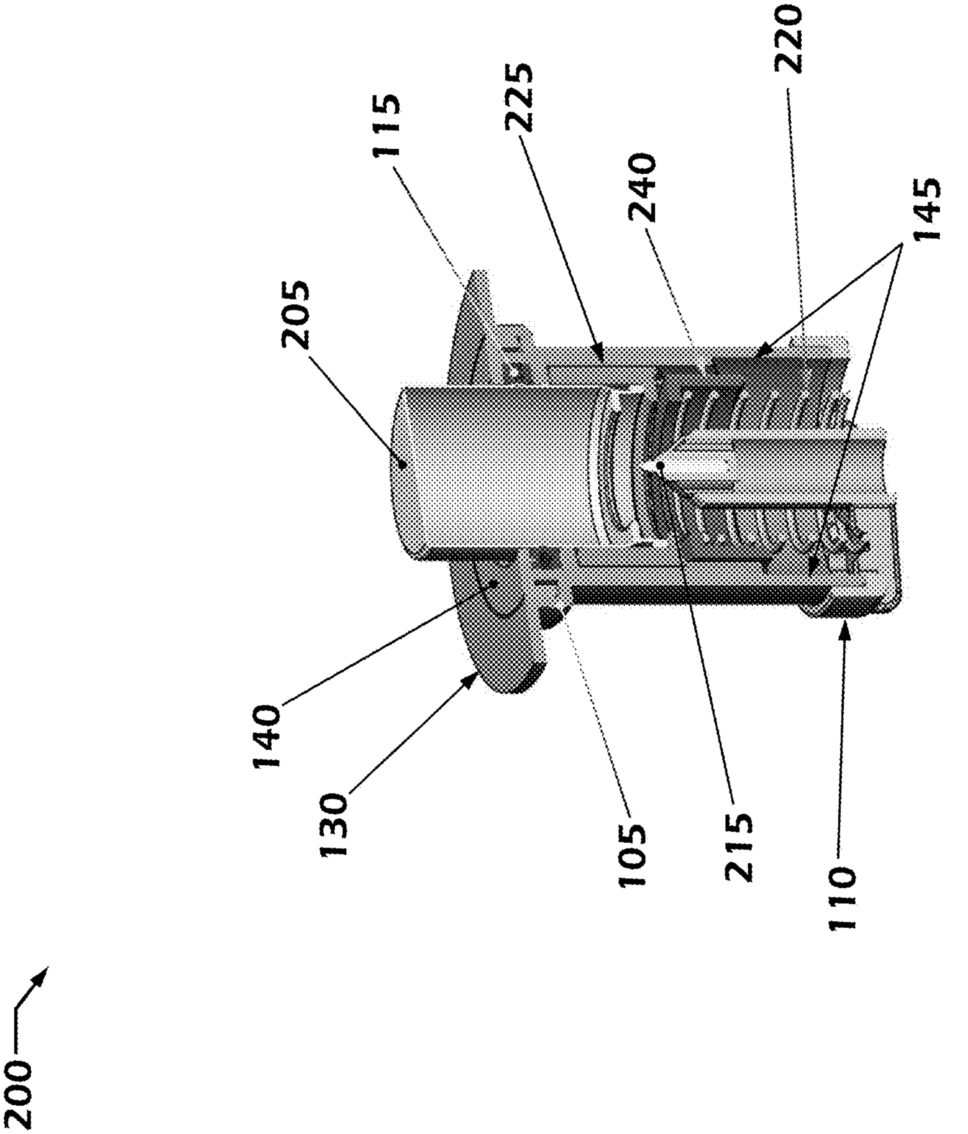
FIG. 5 illustrates a detailed cross-sectional isometric view of the retaining-ejecting mechanism in accordance with an example embodiment where the cleaning pod is inserted into the chamber.

In particular, FIG. 4 illustrates the configuration of an insert guide 225, spring retainer 240, and spring 220 when a pod 205 is not engaged therewith. FIG. 5 illustrates the pod 205 engaging with the insert guide 225 as the insert guide 225 begins to engage the spring retainer 240 to cause the compression of the spring 220 as the pod 205 is pressed into the chamber 130.

FIG. 6 illustrates the configuration of the insert guide 225, spring retainer 240, and spring 220 when the pod 205 is in the retained position. For example, the insert guide 225 has engaged the spring retainer 240 to cause the spring retainer 240 to compress the spring 220 and to cause the spring retainer 240 to engage with an alcove or compartment in the lower portion of the chamber. The engagement of the spring retainer 240 with the alcove or compartment in the lower portion of the chamber prevents the compressed spring 220 from being able to push the spring retainer 240 back toward the unengaged position illustrated in FIGS. 4 and 5.

Figure 7:
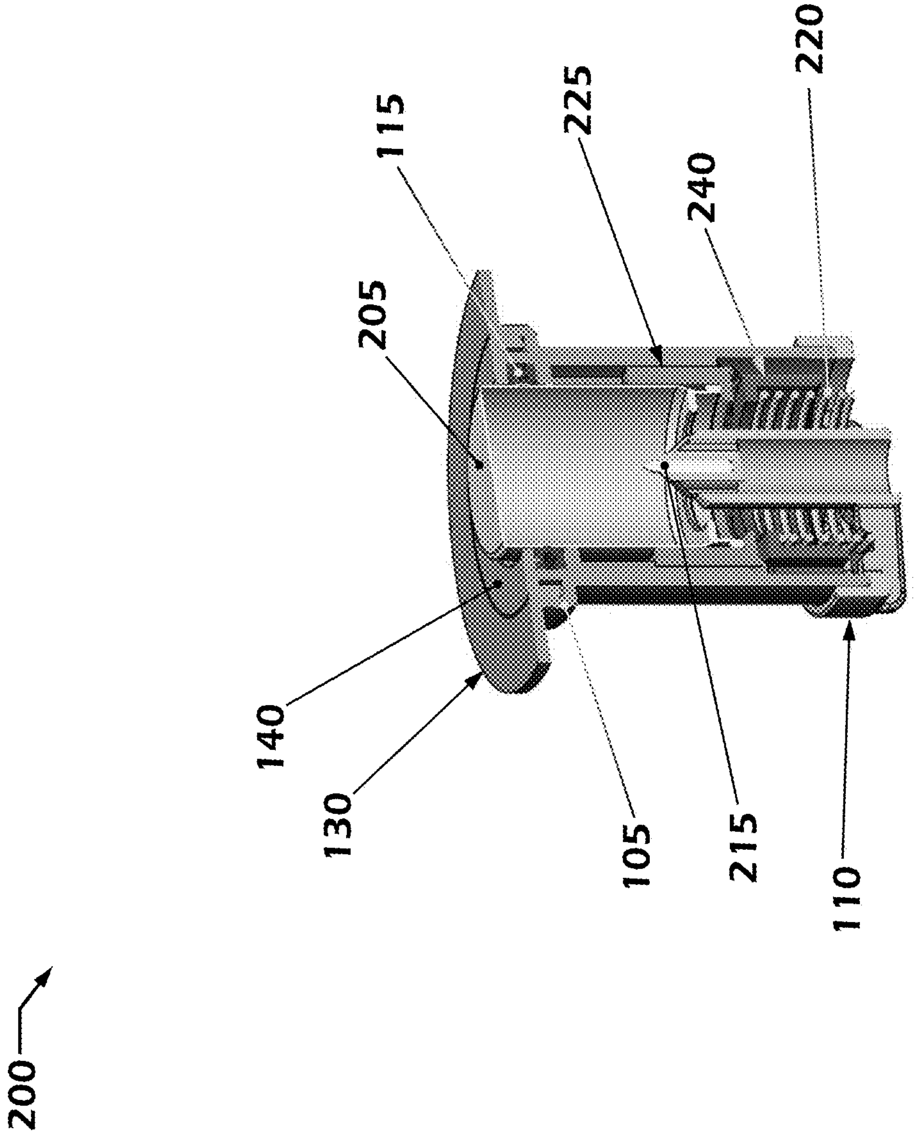
FIG. 7 illustrates a detailed cross-sectional isometric view of the retaining-ejecting mechanism in accordance with an example embodiment where the cleaning pod is retained within the retained position of the retaining-ejecting mechanism.

FIG. 7 illustrates the configuration of the insert guide 225, spring retainer 240, and spring 220 as the spring retainer 240 is released from engagement with the alcove or compartment in the lower portion of the chamber 130 such that the spring 220 is able to push the spring retainer 240 (and indirectly the insert guide 225 and pod 205) back toward their respective unengaged positions.

Figures 8A, 8B, 8C, 8D, 8E, 8F, 8G:
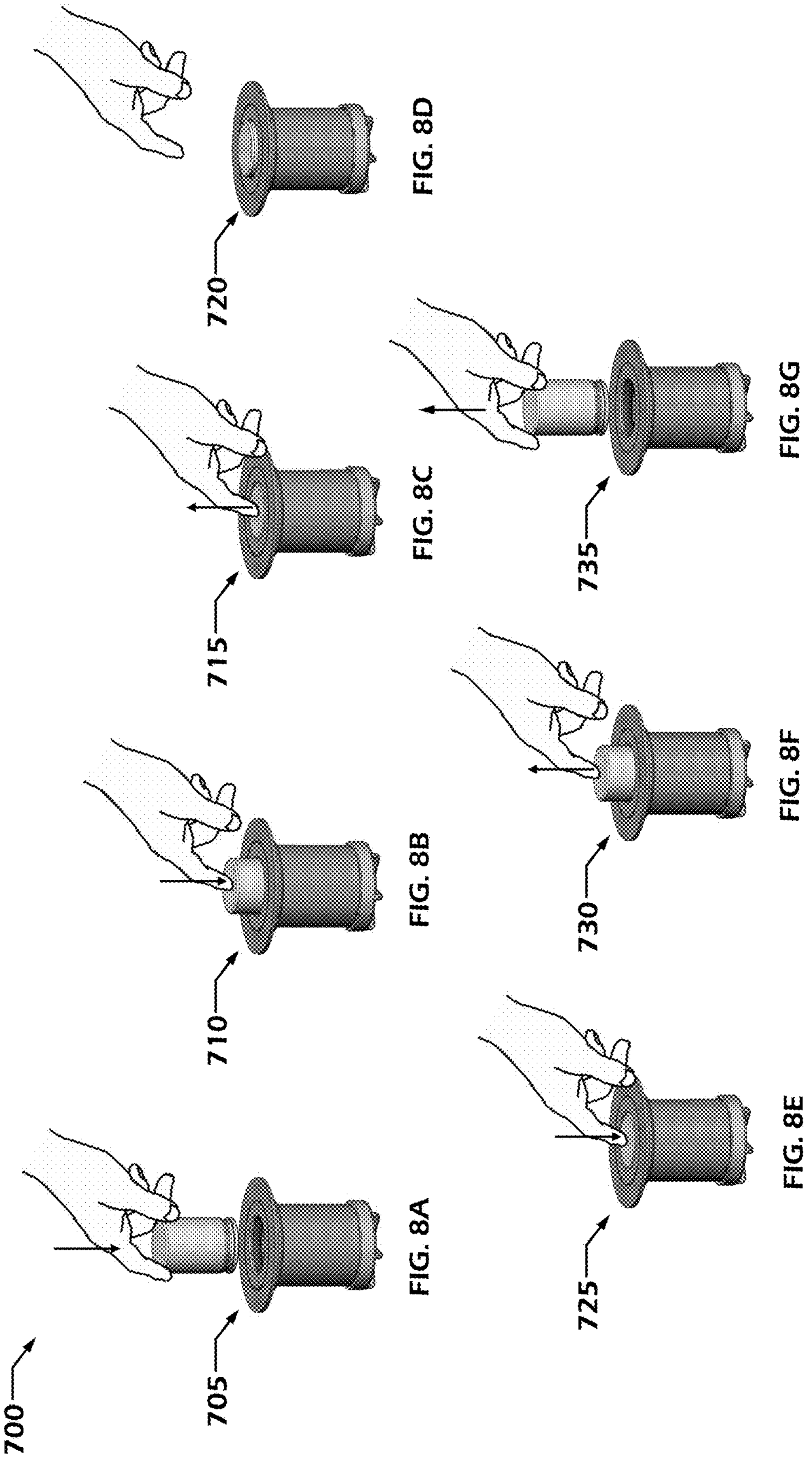
FIG. 8A illustrates a detailed isometric view of the input required to insert the cleaning pod into the chamber in accordance with an example embodiment.
FIG. 8B illustrates a detailed isometric view of the input required to insert the cleaning pod into the retaining-ejecting mechanism in accordance with an example embodiment.
FIG. 8C illustrates a detailed isometric view of the input required to press the cleaning pod into the retained position of the retaining-ejecting mechanism in accordance with an example embodiment.
FIG. 8D illustrates a detailed isometric view of the input required to retain the cleaning pod within the retained position of the retaining-ejecting mechanism in accordance with an example embodiment.
FIG. 8E illustrates a detailed isometric view of the input required to release the cleaning pod from the retained position of the retaining-ejecting mechanism in accordance with an example embodiment.
FIG. 8F illustrates a detailed isometric view of the input required to release the cleaning pod from the retaining-ejecting mechanism in accordance with an example embodiment.
FIG. 8G illustrates a detailed isometric view of the input required to release the cleaning pod from the chamber in accordance with an example embodiment.

The series of FIGS. 8A-8G, provides a method 700 for inserting and removing the pod 205 to and from the chamber 130 of the container 50. FIG. 8A illustrates the input required to insert the pod 205 into the chamber 130 (step 705). FIG. 8B illustrates the input required to insert the pod 205 into the retaining-ejecting mechanism 200 (step 710). FIG. 8C illustrates the input required to press the pod 205 into the retained position of the retaining-ejecting mechanism 200 (step 715). FIG. 8D illustrates the input required to retain the pod 205 within the retained position of the retaining-ejecting mechanism 200 (step 720). FIG. 8E illustrates the input required to release the pod 205 from the retained position of the retaining-ejecting mechanism 200 (step 725). FIG. 8F illustrates the input required to release the pod 205 from the retaining-ejecting mechanism 200 (step 730). FIG. 8G illustrates the input required to release the pod 205 from the chamber 130 (step 735).

Figure 9:
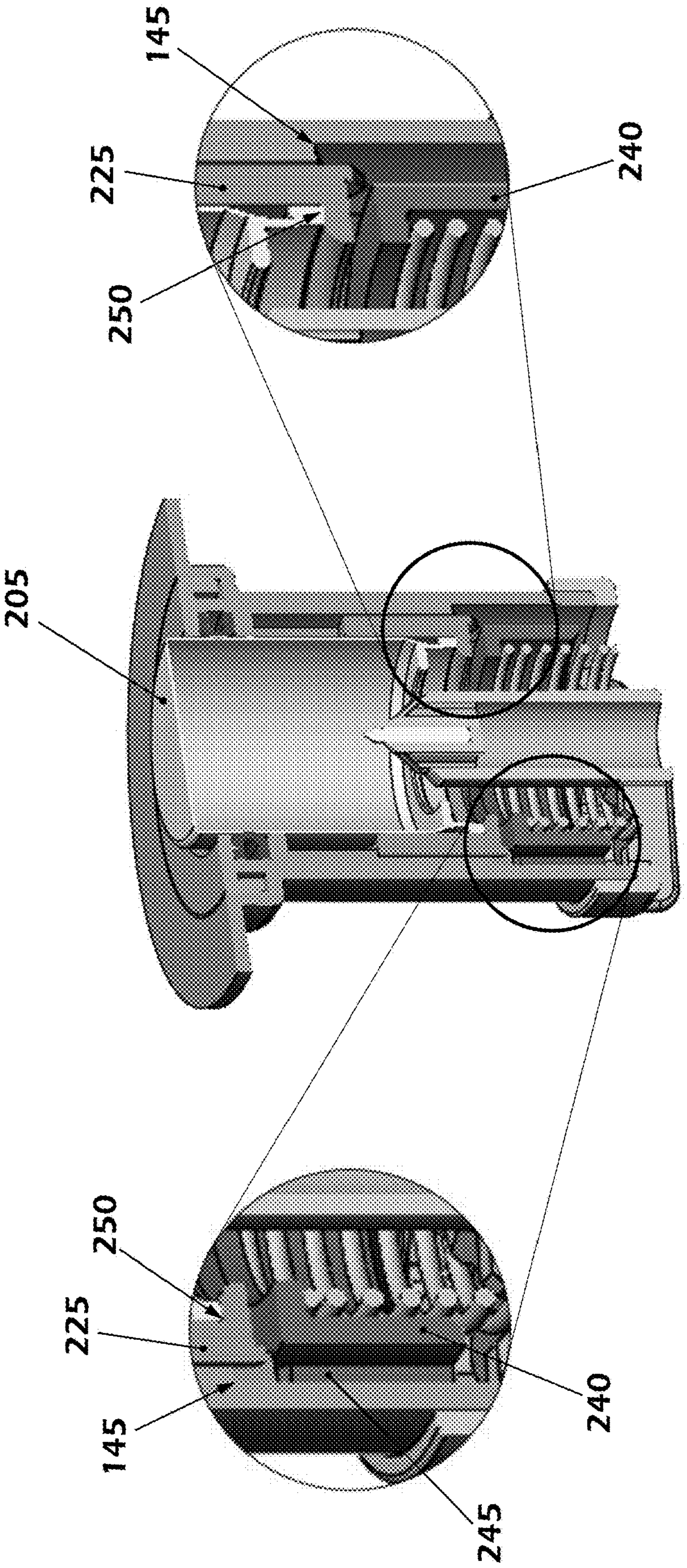
FIG. 9 illustrates an enlarged detailed cross-sectional isometric view of the retaining-ejecting mechanism highlighting design features in accordance with an example embodiment where the cleaning pod is retained within the retained position of the retaining-ejecting mechanism.

FIG. 9 provides an enlarged detailed cross-sectional isometric view of the retaining-ejecting mechanism 200 highlighting the portions of the insert guide 225, spring retainer 240, and larger alcove 145 in the lower chamber wall 110. In an example embodiment, as the pod 205 is pressed into the retaining-ejecting mechanism 200, the pod engages contact with the insert guide 225 at an engagement surface 250. This unidirectional motion forces the insert guide 225 into the spring retainer 240, such that the spring retainer 240 is also forced in the same unidirectional motion. The spring retainer 240 is designed such that a wider portion of the spring retainer 240 is pushed into a larger alcove 145 in the lower chamber wall 110. In an example embodiment, the spring retainer 240 is designed as a cam 245, wherein the cam 245 profile rotates following the unidirectional downward motion of the pod 205 as pressed into the retaining-ejecting mechanism 200. As the pod 205 is pressed into the retained position of the retaining-ejecting mechanism 200, the spring retainer 240 may rotate freely and is reset to the orientation of least spring resistance, wherein the orientation of least spring resistance is the same as the initial position of the spring retainer 240 at the empty and/or released position with respect to the axis of the unidirectional motion of the pod 205. As the pod 205 is pressed again after being retained in the retained position of the retaining-ejecting mechanism 200, the spring retained 240 is forced to rotate once again. The cam 245 profile of the spring retainer 240 causes the spring retainer to rotate out of the alcove of the lower chamber wall 110, thus returning to the initial empty and/or released position.

Figure 10D:
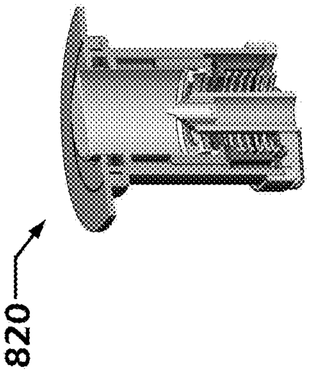
FIG. 10D illustrates a detailed cross-sectional isometric view of the retaining-ejecting mechanism with the cleaning pod in the retained position of the retaining-ejecting mechanism in accordance with the example embodiment shown in FIG. 8D.
Figure 10C:
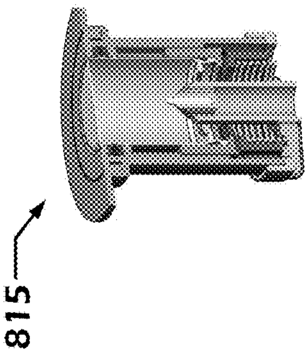
FIG. 10C illustrates a detailed cross-sectional isometric view of the retaining-ejecting mechanism with the cleaning pod in the retaining-ejecting mechanism in accordance with the example embodiments shown in FIG. 8C and FIG. 8E.
Figure 10B:
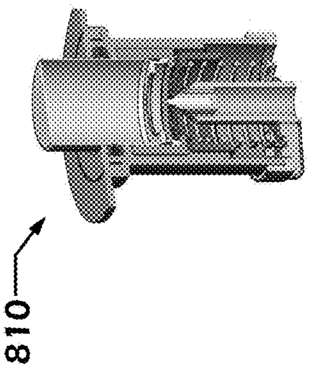
FIG. 10B illustrates a detailed cross-sectional isometric view of the retaining-ejecting mechanism with the cleaning pod in the chamber in accordance with the example embodiments shown in FIG. 8B and FIG. 8F.
Figure 10A:
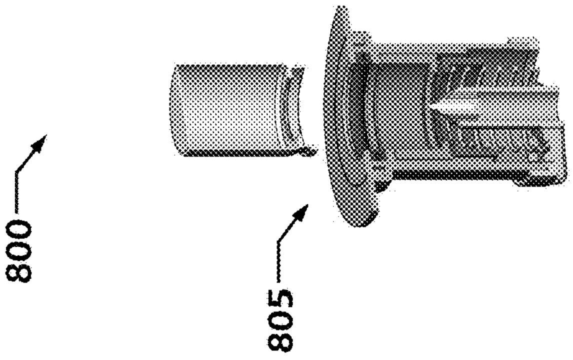
FIG. 10A illustrates a detailed cross-sectional isometric view of the retaining-ejecting mechanism with the cleaning pod removed from the chamber in accordance with the example embodiments shown in FIG. 8A and FIG. 8G.

The series of FIGS. 10A-10D provides a detailed cross-sectional isometric view of the retaining-ejecting mechanism 200 with the pod 205 illustrated as shown in the series of FIGS. 8A-8G of method 800. FIG. 10A illustrates the retaining-ejecting mechanism 200 with the pod 205 removed from the chamber 130 of FIG. 8A and of FIG. 8G (step 805). This also illustrates the orientation of the retaining-ejecting mechanism 200 at which the least spring resistance exists against the spring retainer 240 and thus the insert guide 225 in the opposing direction. FIG. 10B illustrates the retaining-ejecting mechanism 200 with the pod 205 inserted into the chamber 130 of FIG. 8B and of FIG. 8F (step 810). This also illustrates the orientation of the retaining-ejecting mechanism 200 at which a near-minimum spring resistance exists against the spring retainer 240 and thus the insert guide 225 in the opposing direction. FIG. 10C illustrates the retaining-ejecting mechanism 200 with the pod 205 pressed into the retaining-ejecting mechanism 200 of FIG. 8C and of FIG. 8E (step 815). This also illustrates the orientation of the retaining-ejecting mechanism 200 at which the maximum spring resistance exists against the spring retainer 240 and thus the insert guide 225 in the opposing direction. FIG. 10D illustrates the retaining-ejecting mechanism 200 with the pod 205 retained within the retained position of the retaining-ejecting mechanism 200 of FIG. 8D (step 820). This also illustrates the orientation of the retaining-ejecting mechanism 200 at which a near-maximum spring resistance exists against the spring retainer 240 and thus the insert guide 225 in the opposing direction.

Figure 11:
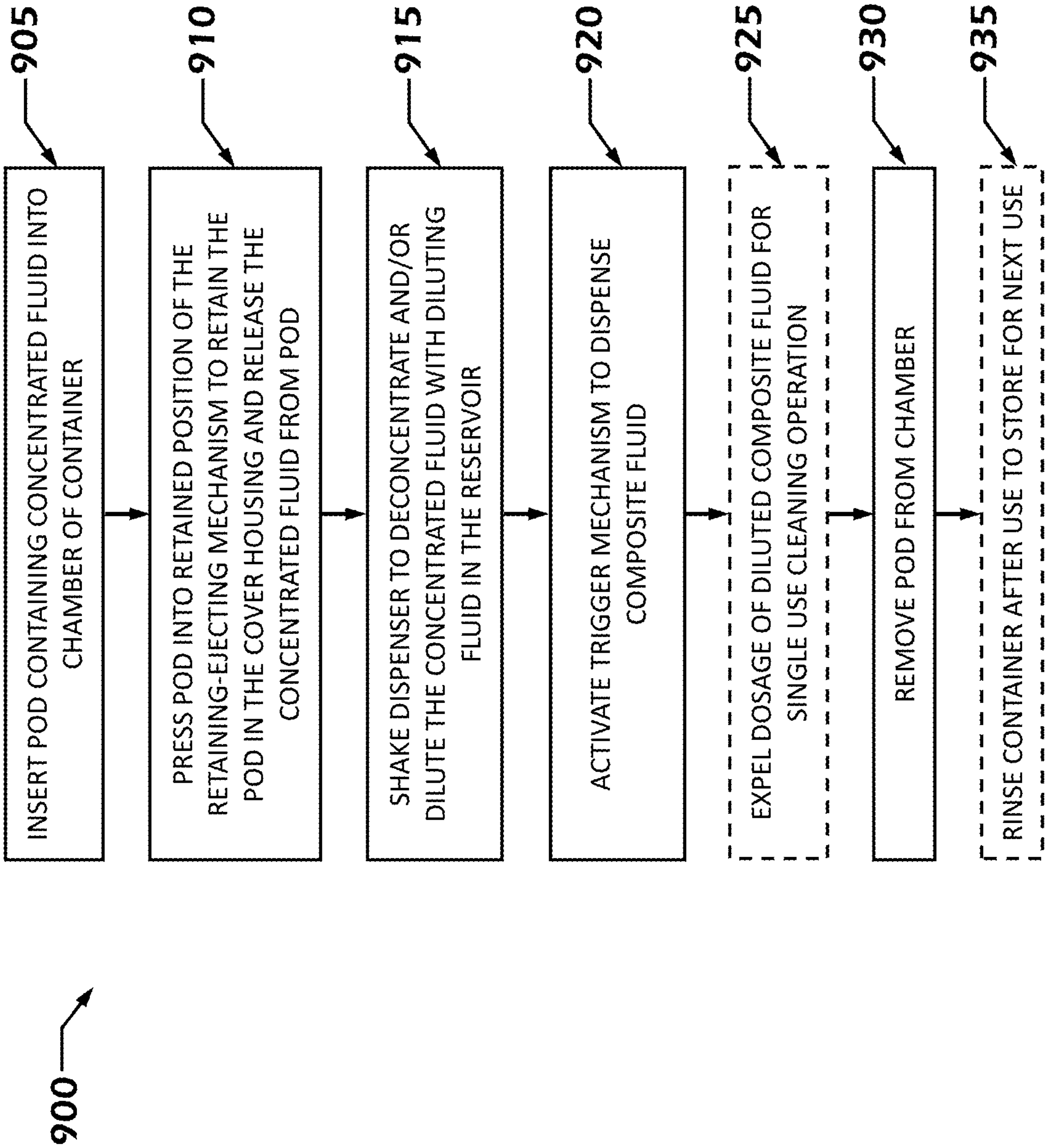
FIG. 11 provides a flowchart illustrating various processes for using a container and pod in accordance with example embodiments.

FIG. 11 provides a flowchart of the use methodology 900 for the container 50. In various embodiments, the container 50 is used to dispense composite fluid for consumption (e.g., a potable beverage that may be drunk or imbibed), for performing a cleaning operation, and/or the like. At the first block 905, a pod 205 containing a concentrated fluid is inserted into the chamber 130 of the cover housing 100. At the second block 910, the pod 205 is pressed into the retained position of the retaining-ejecting mechanism 200 by the user to retain the pod 205 in the cover housing 100, and thus releasing the concentrated fluid from the pod 205 into the base 600 reservoir. At the third block 915, the container 50 is shaken to deconcentrate and/or dilute the concentrated fluid with the contents of the reservoir 650. For example, shaking the container 50 causes the diluting fluid within the reservoir 650 to be mixed with the concentrated fluid released from the pod 205 to form a composite fluid. At the fourth block 920, the composite fluid is dispensed from the reservoir 650 and out of the dispensing mechanism 300. For example, in an example embodiment, the trigger mechanism 400 is activated to cause the composite fluid to be dispensed from the reservoir 650. At the fifth block 925, the dosage of contents of the reservoir 650 have been expelled (e.g., consumed, used for a cleaning operation, and/or the like). At the sixth block 930, the pod 205 may be removed from the chamber 130 and properly disposed. At the final block 935, the container 50 cover housing 100 and base 600 can be rinsed before storing for the next use.

Figure 12B:
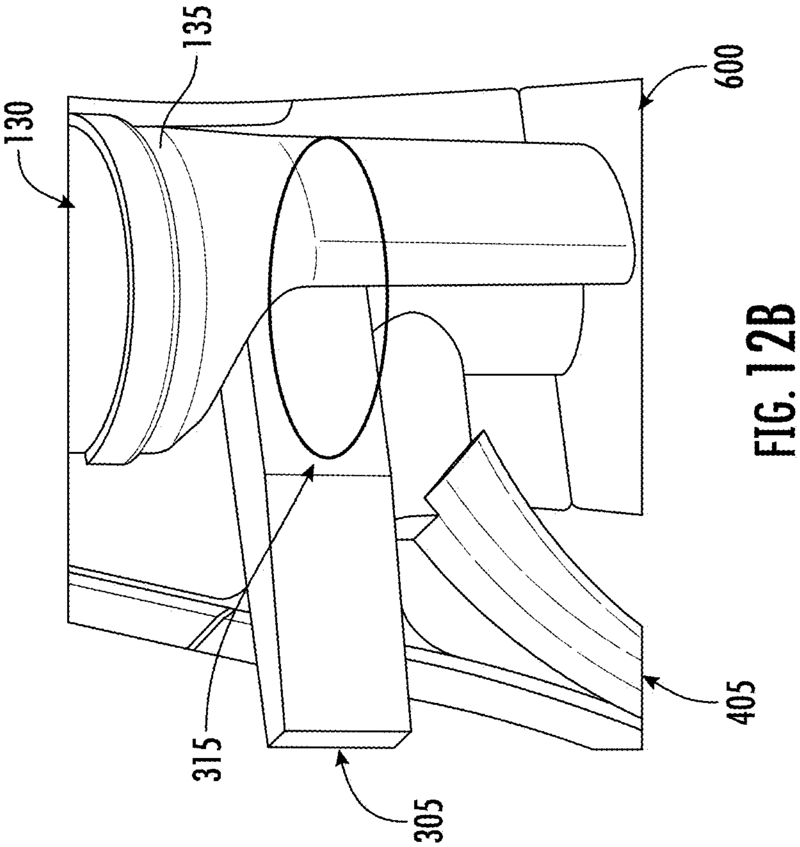
FIG. 12B illustrates a detailed isometric view highlighting the dispensing mechanism and the trigger mechanism in accordance with example embodiments.
Figure 12A:
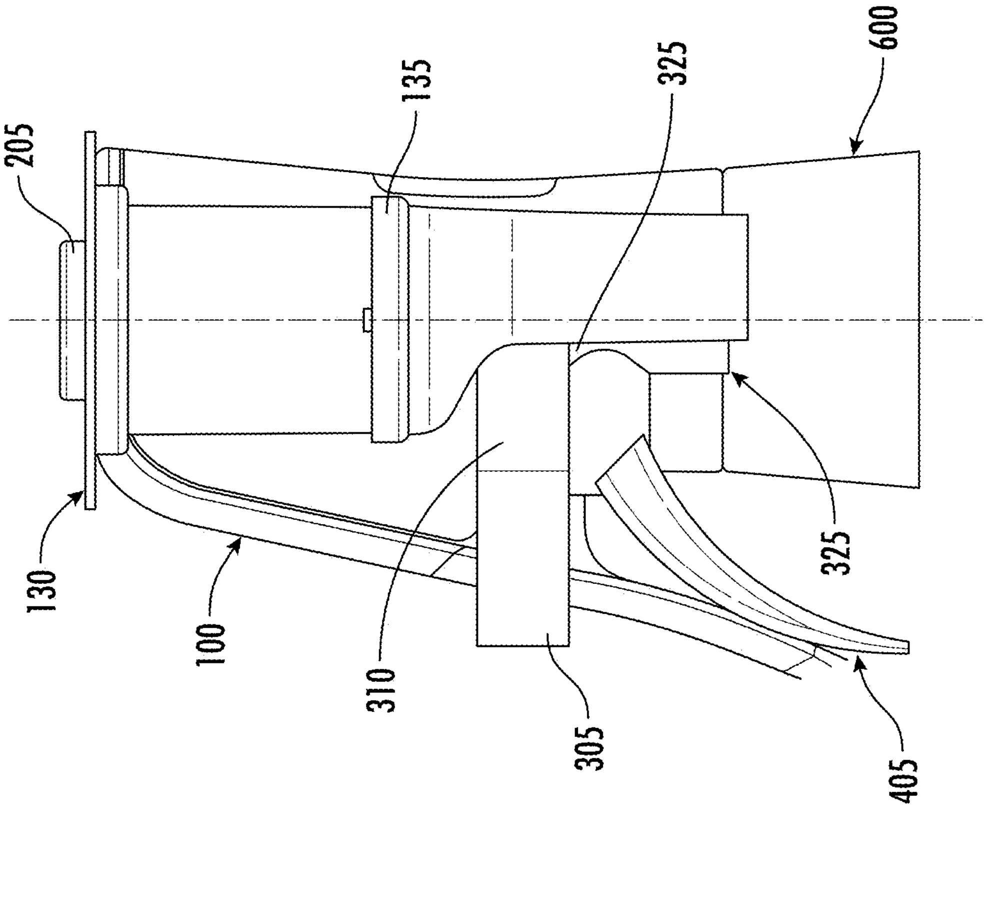
FIG. 12A illustrates a detailed side view highlighting the retaining-ejecting mechanism, dispensing mechanism, and the trigger mechanism in accordance with example embodiments.

The series of FIGS. 12A-12B provides a detailed view of the retaining-ejecting mechanism 200, dispensing mechanism 300, and trigger mechanism 400. In an example embodiment, the at least one drain channel 135 may be configured to reside within a protective cover to prevent damage to or disconnection of the drain channel 135 from the lower chamber wall 110 of the retaining-ejecting mechanism 200. In an example embodiment, the at least one drain channel 135 is a large, smoothly shaped drain configured to transfer the concentrated fluid from the pod 205 to the base 600 reservoir without limiting space for the dispensing mechanism 300 and/or trigger mechanism 400. The at least one drain channel 135 may be configured around the design of the dispensing mechanism 300 and/or trigger mechanism 400 by flowing the concentrated fluid around the perimeter of the internal structure of the cover housing 100. In an example embodiment, the at least one drain channel 135 is configured as a U-shaped tubular flow channel around the dispensing pipette 325 and flow channel 315.

Figure 13:
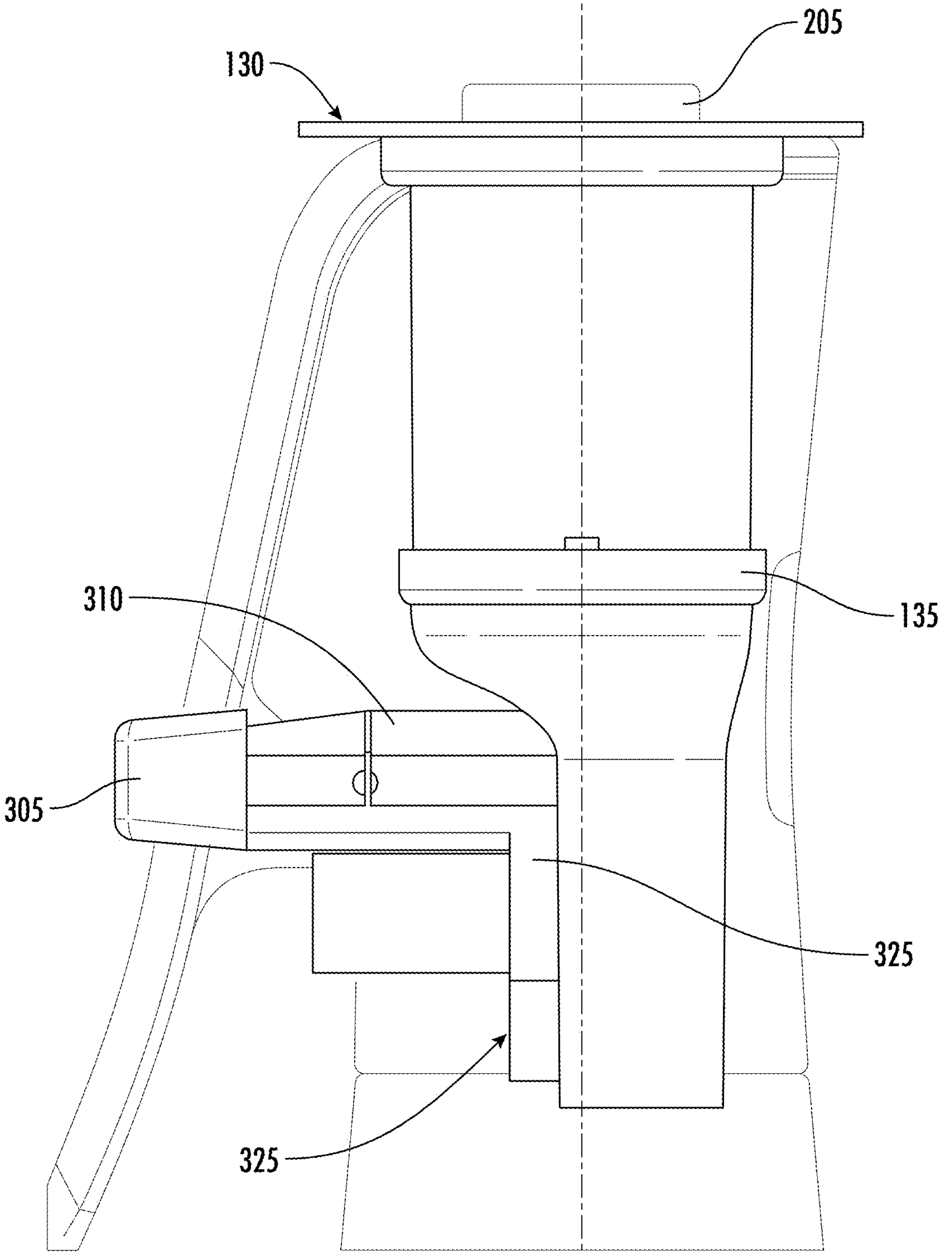
FIG. 13 illustrates a side view of the dispensing mechanism in accordance with example embodiments.

FIG. 13 provides a side view of the dispensing mechanism 300 and the trigger mechanism 400. FIG. 13 displays a silhouette of the container 50 behind the dispensing mechanism 300 and the trigger mechanism 400 for representation of assembly. In an example embodiment, the atomization area 310 is smoothly formed, providing a natural flow of the composite fluid from the reservoir 650 to the nozzle 305 when actuated.

Figure 14:
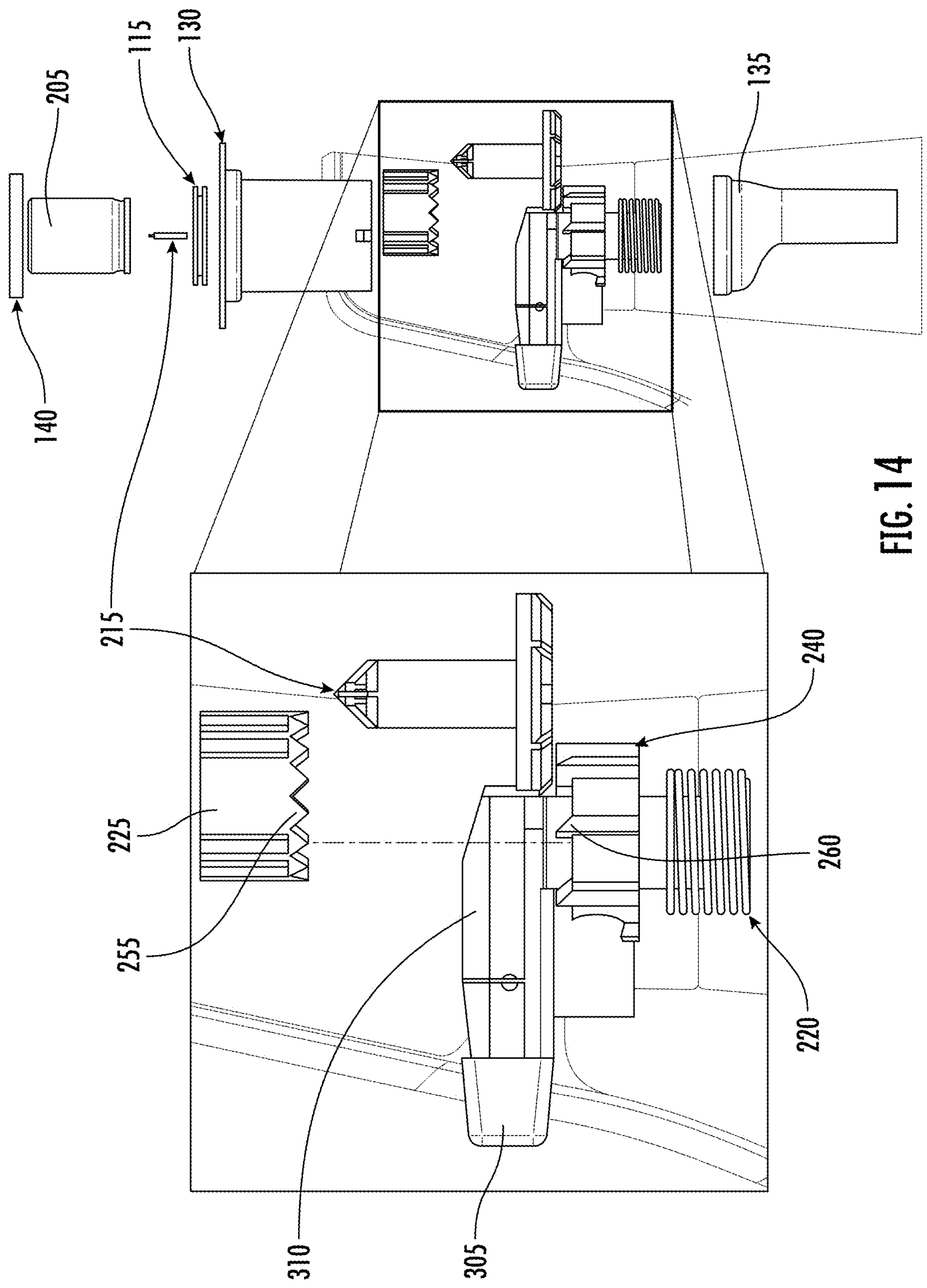
FIG. 14 illustrates an enlarged exploded side view of the dispensing in accordance with example embodiments.

FIG. 14 provides an enlarged exploded side view of the dispensing mechanism 300. In an example embodiment, the puncture tool 215 is a removable device. In an example embodiment, the puncture tool 215 may be configured as a consumable and/or wearable component requiring occasional replacement. In an example embodiment, the insert guide 225 is configured with a series of insert guide engagement teeth 255 at the bottommost surface of the insert guide 225. In an example embodiment, the spring retainer 240 is also configured with a series of spring retainer engagement teeth 260 at the upmost surface of the spring retainer 240. In an example embodiment, the puncture tool 215 is supported by a hollow puncture structure, providing way for the concentrated fluid within the pod 205 to be released into the reservoir 650 via the at least one drain channel 135.

Figure 15:
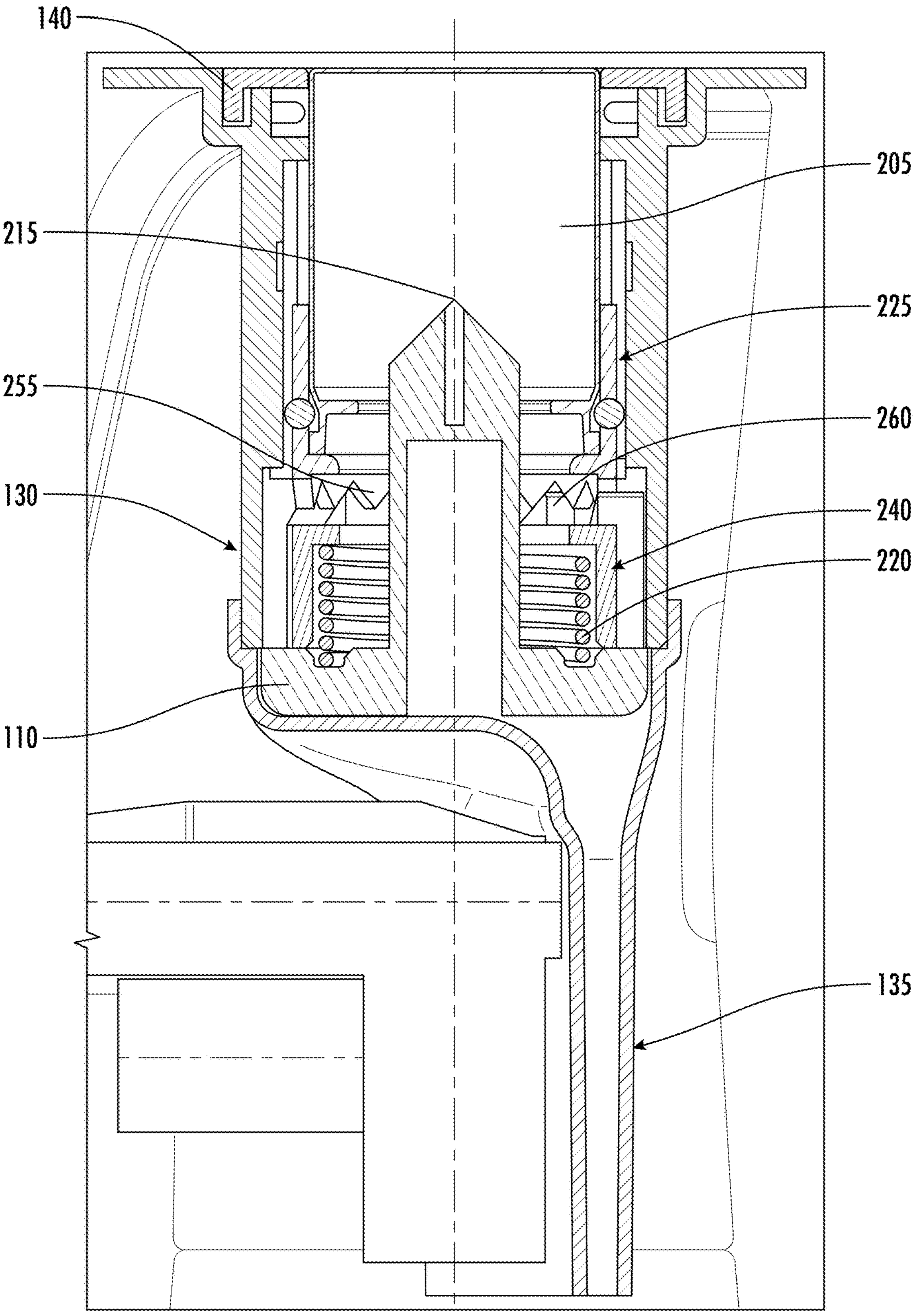
FIG. 15 illustrates a cross-sectional side view of the retaining-ejecting mechanism and the at least one drain channel in accordance with example embodiments.

FIG. 15 provides a cross-sectional side view of the retaining-ejecting mechanism 200 and the at least one drain channel 135. In an example embodiment, the insert guide 225 is configured with a series of insert guide engagement teeth 255 at the bottommost surface of the insert guide 225. In an example embodiment, the spring retainer 240 is also configured with a series of spring retainer engagement teeth 260 at the upmost surface of the spring retainer 240. In an example embodiment, when the pod 205 is retained within the retained position of the retaining-ejecting mechanism 200, the engagement teeth of the insert guide 225 and spring retainer 240 mechanically mesh, thus forcing the spring retainer 240 into a locked and/or retained orientation.

In various example embodiments, the insert guide engagement teeth 255 and spring retainer engagement teeth 260 are configured to mechanically mesh following the insertion of the pod 205 into the chamber 130. In an example embodiment, the retaining-ejecting mechanism 200 forces the insert guide 225 down onto the spring retainer 240 against the shared engagement surfaces 250. In an example embodiment, as the insert guide 225 is forced down onto the spring retainer 240, the meshed assembly (i.e., the joined insert guide 225 and spring retainer 240) is rotated a designated angle as a result of the interaction between the insert guide engagement teeth 255 and the spring retainer engagement teeth 260 to orient the cam 245 profile of the spring retainer 240 into a retained orientation. In an example embodiment, the spring 220 is held in a compressed orientation when the retaining-ejecting mechanism 200 is configured in the retained position. In an example embodiment, forcing the insert guide 225 down onto the spring retainer 240 against the shared engagement surfaces 250 again may release the spring 220 from the compressed orientation, forcing the insert guide 225 and pod 205 therein upward. For example, the rotation of the spring retainer 240 caused by the interaction of the insert guide engagement teeth 255 and the spring retainer engagement teeth 260 causes the spring retainer 240 to release the spring 220. In an example embodiment, following the cam 245 profile, the spring retainer 240 is rotated to its original orientation as the spring 220 compression is released.

Figure 16:
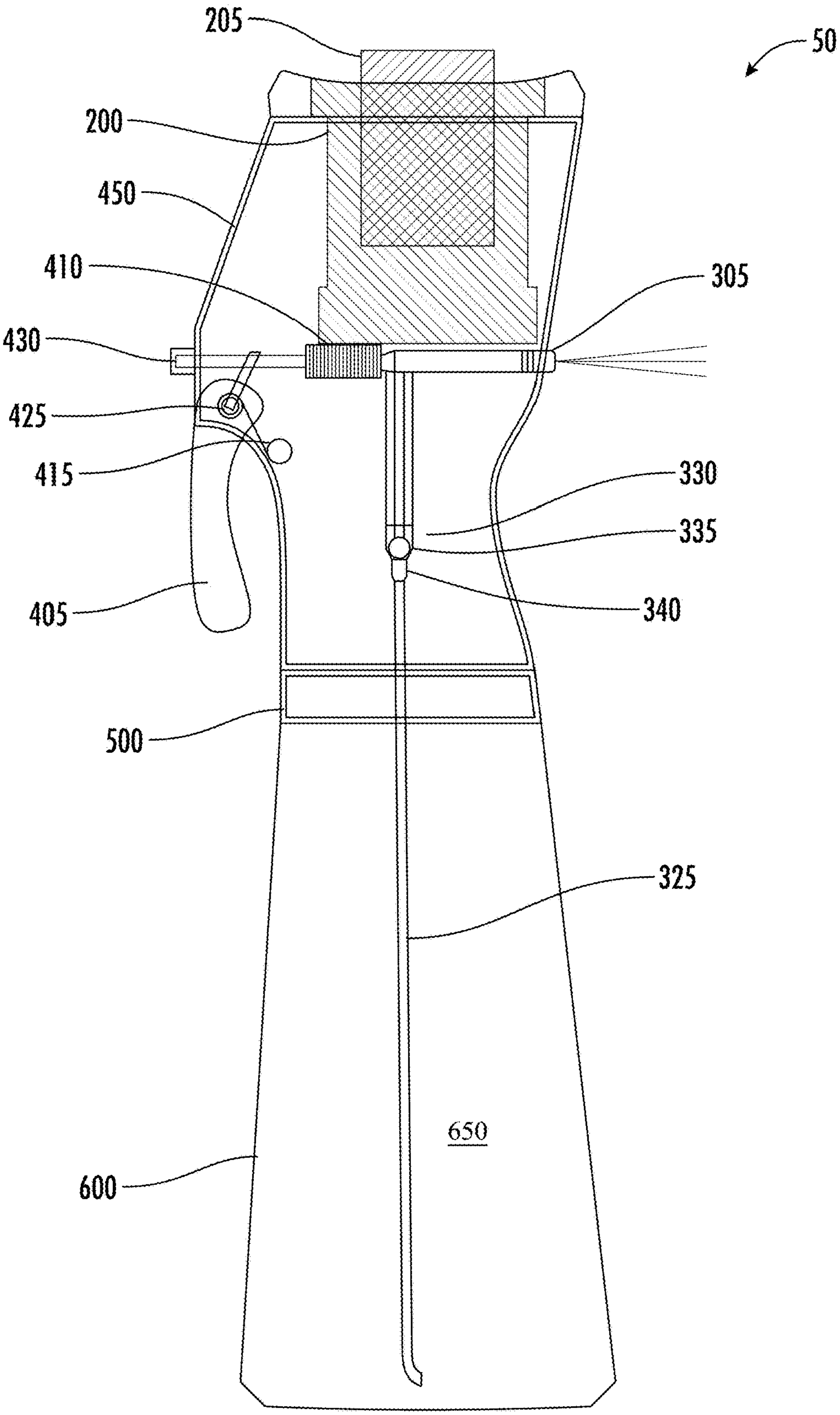
FIG. 16 illustrates a cross-sectional side view of a container in accordance with an example embodiment.

FIG. 16 provides a cross-sectional side view of a container 50. In an example embodiment, a pod 205 is inserted into a retaining-ejecting mechanism 200 located at the topmost region of the cover housing 450. In an example embodiment, the cover housing 450 is mechanically connected to the base 600 via an attachment mechanism 500. In an example embodiment, the attachment mechanism 500 is configured at least a portion of the body made from a clear and/or transparent material. In an example embodiment, the clear and/or transparent material is provided for viewing the fluid level in the reservoir 650. In an example embodiment, the container is configured as an atomizer. In an example embodiment, a dispensing mechanism 300 is provided to transport a composite fluid from the reservoir 650 through a bead housing 330 and out of a nozzle 305. In an example embodiment, the bead housing 330 comprises a valve bead 335 for diverting the composite fluid and a pipette retainer 340 to maintain the position of the dispensing pipette 325.

In various example embodiments, the trigger mechanism 400 is configured with a trigger pivot point 425, allowing actuation of the trigger handle 405. In an example embodiment, the trigger handle 405 is tensioned about the trigger pivot point 425 via a trigger spring 415. In an example embodiment, a trigger tensioner 430 is incorporated to adjustably configure the trigger spring 415 tension as desired for the individual user and/or use case. In an example embodiment, the trigger handle 405 is located on the opposing side from the nozzle 305. For example, in an example embodiment, the trigger handle 405 and the nozzle 305 are disposed on opposite sides of the cover housing 450 from one another. This configuration provides a rearward-facing trigger mechanism 400. In an example embodiment, the rearward-facing trigger mechanism 400 is intended for actuation via a user's thumb or palm. In various example embodiments, the actuation of the trigger mechanism 400 forces a plunger mechanism 410 to provide fluid pressure on the stored composite fluid, thus transporting the fluid out of the holding area 320, into the atomization area 310, and out of the nozzle 305. In an example embodiment, when the trigger mechanism 400 is released, a vacuum transports fluid back into the holding area 320 for future use.

Example embodiments of the present invention provide pods for storing and providing concentrated fluid and a container 50 for diluting and/or deconcentrating the concentrated fluid (e.g., to form a composite fluid) and dispensing the composite fluid. FIG. 1 and FIG. 2 show an example dispensing mechanism 300 that is an atomizer and example pod 205 within a container 50 (e.g., atomizer, hand pump, foaming dispenser, pour spout, suction-based dispenser (e.g., a straw), and/or the like) to provide concentrated fluid to the container 50. The user may then use the composite fluid. In an example embodiment, a pod 205 may be configured to contain approximately one session's worth (e.g., one cleaning session's worth, one beverage unit worth, and/or the like) of concentrated fluid for mixing such that when the user is finished cleaning and/or finished consuming the beverage, the user need not store unused composite fluid.

Example embodiments of the present invention provide an attachment mechanism 500 to attach the cover housing 100 to the base 600. The attachment mechanism 500 may be designed to accommodate threads (e.g., twisted and/or screwed) onto and/or into the design of the cover housing 100 and/or base. In an example embodiment, the attachment mechanism 500 is configured as part of the design of the cover housing 100. In an example embodiment, the attachment mechanism 500 is configured as part of the design of the base 600. In an example embodiment, the attachment mechanism 500 is configured independently from either the design of the cover housing 100 and/or the design of the base 600 to operate as a singular mechanism configured to attach the cover housing 100 to the base 600 without regard to the design of the cover housing 100 and/or the design of the base 600.

Example embodiments of the present invention also provide an insert guide 225 for the pod 205. The insert guide 225 provides a guided unidirectional translation of the pod 205 when inserted into or removed from the chamber 130. A plurality of positions are defined and the insert guide 225 is designed to accommodate the aforementioned positions. At least one insert guide stop marker 235 may be integrated in the design of the insert guide 225 to achieve the positioning of the known positions. A clip 125 may be placed in one or more of the at least one insert guide stop markers 235 to hold a desired position of the insert guide 225. A retainer 120 may also be incorporated to retain the clip 125 within the bounds of the at least one insert guide stop marker 235 to prevent undesired and/or unintentional movement of the insert guide 225. In this example embodiment, the insert guide 225 provides the means of the retaining-ejecting mechanism 200. In an example embodiment, the fluid seal 115 also enables the pod 205 to maintain position within the retaining-ejecting mechanism 200 due to the friction fit within the bounds of the fluid seal 115.

In an example embodiment, the pod 205 is configured to contain 0.5 to 2 ounces of the concentrated fluid. In an example embodiment, the pod 205 is configured to contain 0.25 to 1.25 ounces of concentrated fluid (e.g., 0.5 to 1 ounce). In an example embodiment, the pod 205 is configured to contain 1.5 to 3 ounces of the concentrated fluid. In an example embodiment, the pod 205 is configured to contain 1-2 ounces of the concentrated fluid. In an example embodiment, the reservoir 650 has a convex end surface configured to direct the composite fluid toward a mouth of the dispensing pipette. In an example embodiment, the mouth of the dispensing pipette extends from the center of the cover housing 100 into the center of the base. In an example embodiment, the base comprises a metal or other resilient material such as glass, wood, plastic, rubber, and/or the like. In an example embodiment, the reservoir portion has a capacity of 10-40 ounces. In an example embodiment, the reservoir portion has a capacity of 5 to 15 ounces. In an example embodiment, the reservoir portion has a capacity of 20 to 40 ounces.

According to another aspect of the present invention, a pod 205 is provided. In an example embodiment, a pod 205 comprises a cup portion and a puncture membrane portion (e.g., dispensing surface 206). The puncture membrane portion is configured to seal concentrated fluid within the cup portion. The pod 205 may be configured to be secured within a retaining-ejecting mechanism 200 of the chamber 130.

In example embodiments, the pod 205 is configured to contain 1-2 ounces of the concentrated fluid. In an example embodiment, the pod 205 is configured to contain 0.5 to 2 ounces of the concentrated fluid. In an example embodiment, the pod 205 is configured to contain 1.5 to 3 ounces of the concentrated fluid. In an example embodiment, at least a portion of the pod 205 comprises metal. In various embodiments, the pod 205 may be comprised of a natural post recycled material, rubber, aluminum, plastic, cardboard, paper, etc. The shape of the pod 205 may be round/spherical, cubic, ovoid, polyhedron (e.g., a tetrahedron, pyramid, cuboid, rectangular cuboid, etc.), and/or the like, as appropriate for the application.

According to yet another aspect of the present invention, a method of dispensing a composite fluid from a pod 205 is provided. In an example embodiment, the method comprises providing a container 50 configured for dispensing composite fluid. The container 50 comprises a cover housing 100 comprising a pod 205 chamber 130 configured to receive a pod 205 containing concentrated fluid therein, a base 600, and a dispensing mechanism 300 extending from the nozzle into a reservoir 650 portion of the base. The cover housing 100 comprises a retaining-ejecting mechanism 200 which enables the pod 205 to be inserted into a retained position at least partially within the recess, retained in the retained position, and released from the retained position following designated user input, drain channel 135, a dispensing mechanism 300, a trigger mechanism 400, an attachment mechanism 500, and the chamber 130. The base 600 comprises a reservoir 650 configured for receiving the concentrated fluid from the pod 205, for example, via the drain channel 135. The method further comprises mixing the concentrated fluid with a diluting fluid in the reservoir 650 to form a composite fluid and activating the trigger handle 405. Activating the trigger handle 405 causes composite fluid (e.g., a mixture of concentrated fluid and diluting fluid) to be dispensed from the reservoir portion, through the dispensing pipette 325, and out of the nozzle 305.

Figure 17B:
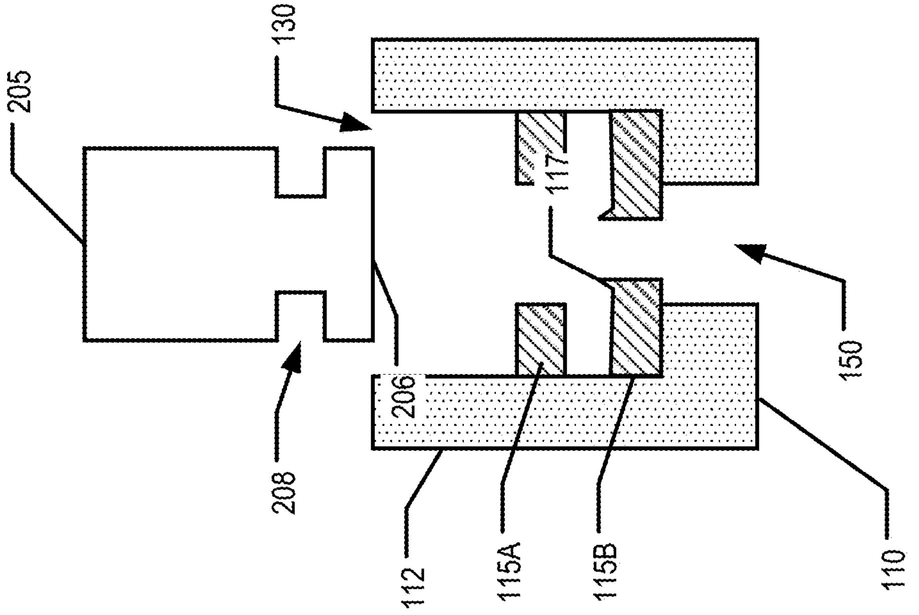
FIGS. 17A-17B each illustrate a cross-sectional view of an example pod and an example embodiment of a receiving recess, in accordance with various embodiments of the present disclosure.
Figure 17A:
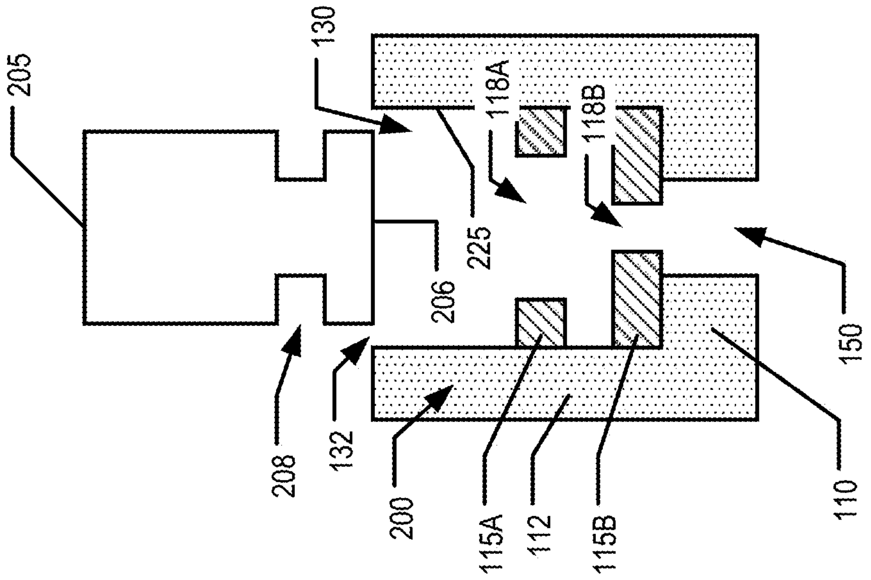

FIGS. 17A and 17B provide cross-sectional views of additional example embodiments of a receiving recess and/or chamber 130 having a retaining-ejecting mechanism 200 therein. As shown in FIGS. 17A and 17B, in various embodiments, a retaining-ejecting mechanism 200 includes a first fluid seal 115A and a second fluid seal 115B. In various embodiments, the second fluid seal 115B may be disposed adjacent to a lower chamber wall 110. For example, the recess and/or chamber 130 is defined at least in part by a lower chamber wall 110, a sidewall 112 that extends outward from the lower chamber wall 110 and a recess and/or chamber opening 132. In the illustrated embodiment, the second fluid seal 115B extends out from the sidewall 112 parallel to and/or along/adjacent to the lower chamber wall 110. A central opening 118B in the second fluid seal 115B defines, at least in part, a fluid path 150 from the recess and/or chamber 130 to either the reservoir 650 or a proportioning chamber 2305. In various embodiments, the first fluid seal 115A and the second fluid seal 115B are configured such that, when a pod 205 is disposed within the recess and/or chamber 130 in a retained position, the first fluid seal 115A and the second fluid seal 115B prevent fluid from being able to exit the container via the recess and/or chamber 130.

The first fluid seal 115A extends out from the sidewall 112 between the second fluid seal 115B and the recess and/or chamber opening 132. For example, the first fluid seal 115A is disposed between the uppermost edge of the second fluid seal 115B and the recess and/or chamber opening 132. In various embodiments, the pod 205 comprises a notch 208 and the distance between the first fluid seal 115A and the second fluid seal 115B along the sidewall 112 corresponds to a distance between a dispensing surface 206 of the pod and the notch 208 of the pod 205 configured for use with the container comprising the recess and/or chamber 130.

In various embodiments, a central opening 118A of the first fluid seal 115A is configured to enable a portion of the pod 205 disposed between the dispensing surface 206 and the notch 208 to pass therethrough. The first fluid seal 115A is configured to engage the notch 208 of the pod 205 so as to retain the pod 205 within the recess and/or chamber 130. The second fluid seal 115B is configured to engage the dispensing surface 206. For example, the second fluid seal 115B is configured to act as a seat for at least a portion of the dispensing surface 206 such that when the pod 205 is in the retained position, at least a portion of the dispensing surface 206 is seated against the second fluid seal 115B and the first fluid seal 115A engage the notches 208.

In various embodiments, the first seal 115A and/or the second seal 115B may be disposed within the recess wall. In various embodiments, the first seal 115A may be configured to keep fluid from expelling from the recess, and the second seal 115B may be configured to keep fluid from expelling the reservoir. In various embodiments, the first seal 115A and/or the second seal 115B may be configured to directly or indirectly engage with a pod inserted into a recess. In one or more embodiments, the first seal 115A and/or the second seal 115B may be configured to maintain the position of the pod within the retaining-ejecting mechanism. In various embodiments, a retaining-ejecting mechanism may comprise just a first seal 115A. The first seal is configured to prevent liquid from exiting the recess 130 when a pod 205 is inserted within a retaining-ejecting mechanism. In various embodiments, the contents of within the pod 205 is configured to flow from within the pod to the reservoir, wherein the seal 115A is configured to prevent contents within the pod 205 from expelling within the retaining-ejecting mechanism.

In various embodiments, the retaining-ejecting mechanism 200 includes an insert guide 225. In the illustrated embodiments of FIGS. 17A and 17B, the inner surface of the sidewall 112 acts as the insert guide 225 so as to assist translation of the inserted pod 205 along a unidirectional path in or out of the recess and/or chamber 130.

In various embodiments, the first fluid seal 115A and/or the second fluid seal 115B is formed of a resilient material and/or biased such that when a pod 205 that is in the retained position within the recess and/or chamber 130 is pressed on with a force that is directed into the recess and/or chamber 130, the first fluid seal 115A and/or the second fluid seal 115B imparts a recoil force onto the pod 205, causing the pod to be translated into a released position. When the pod 205 is in the released position, the first seal 115A is no longer engaging the notches 208 and the dispensing surface 206 of the pod is no longer seated against the second fluid seal 115B.

In various embodiments, the recess and/or chamber 130 includes a pod opening mechanism 117, such as puncture tool 215. In an example embodiment, the pod opening mechanism 117 is formed and/or secured to the second fluid seal 115B. For example, the pod opening mechanism may include a puncture tool 215 and/or a raised portion configured to interact with the dispensing surface 206 of a pod 205 when the pod 205 is in the retained position such that the dispensing surface 206 is seated against the second fluid seal 115B. In an example embodiment in which the entire contents (e.g., concentrated fluid) is to be dispensed from the pod 205 at a time, the pod opening mechanism may be a puncture tool 215 configured to puncture the dispensing surface 206 and release the concentrated fluid from the pod 205. In an example embodiment in which only a portion of the contents (e.g., concentrated fluid) is to be dispensed from the pod 205 at a time, the pod opening mechanism may be configured to open a sealing mechanism of the dispensing surface 206 to selectively enable release of a portion of the concentrated fluid from the pod 205.

Figure 18A:
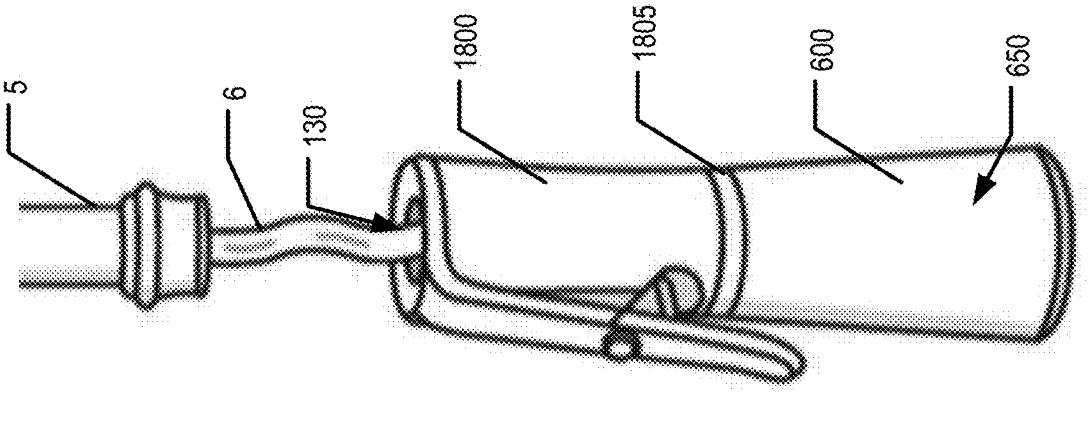
FIGS. 18A-18C illustrates example steps for making a cleaning solution in accordance with various embodiments of the present disclosure.
Figure 18B:
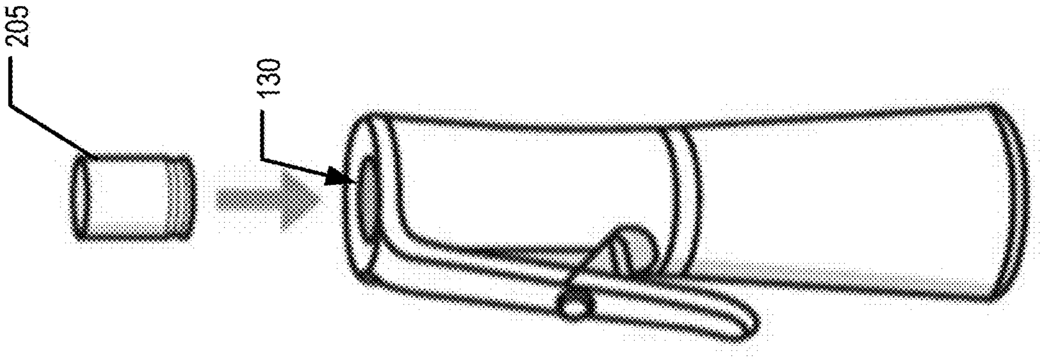
Figure 18C:
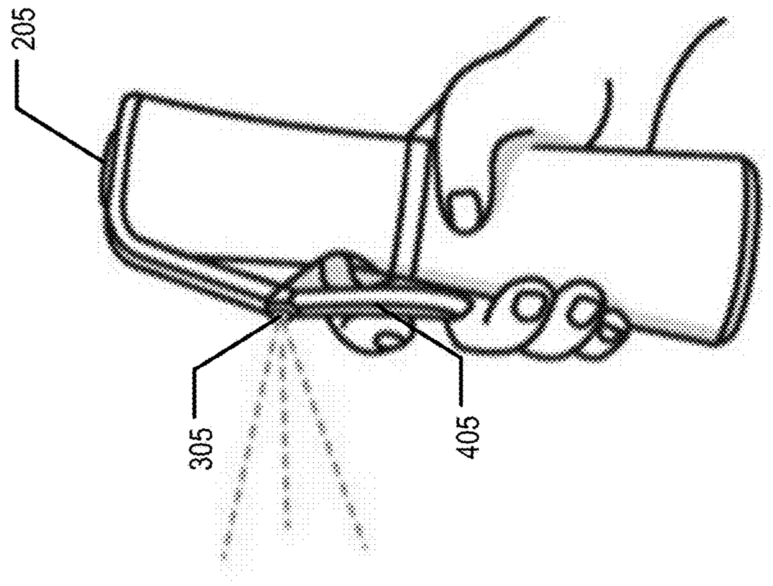

With reference to FIGS. 18A-18C, illustrates example steps on mixing and dispensing a composite fluid. The example illustrated container is a spray bottle configured to produce an atomized stream of composite fluid via a nozzle 305 when a user activates a trigger handle 405. In various embodiments, as depicted in FIG. 18A, the container 1800 may be filled with a diluting fluid 6 through the recess and/or chamber 130. For example, in the illustrated embodiment, the diluting fluid 6 is water being provided from a diluting fluid source 5, such as a faucet. In various embodiments, the diluting fluid 6 may be water or another solvent or fluid appropriate for the desired composite fluid. In various embodiments, the diluting fluid source 5 may be a faucet, a bottle or tank containing diluting fluid, and/or other bulk fluid dispenser. The diluting fluid enters the recess and/or chamber 130 and is provided to the reservoir 650 within the base 600 via fluid path 150, for example. For example, the container 1800 is configured to enable provision of diluting fluid 6 to the reservoir 650 without any disassembly of the container 1800. For example, diluting fluid may be provided to the reservoir 650 of the container 1800 without disconnecting the cover housing 100 from the base 600.

In various embodiments, the container 1800 includes a max fill window 1805. For example, the max fill window 1805 may be a clear portion of the container that enables a user to view when the diluting fluid level has reached a particular level within the reservoir. When the user sees that the diluting fluid level has reached the particular level within the reservoir via the max fill window 1805, the user may stop providing the diluting fluid 6.

As shown in FIG. 18B, once the diluting fluid 6 has been provided to the reservoir 650 via the recess and/or chamber 130, a pod 205 may be inserted into the recess and/or chamber 130 such that the pod 205 is in the retained position. When the pod is in the retained position, at least a portion of the concentrated fluid within the pod 205 is caused to mix with at least a portion of the diluting fluid (e.g., within the reservoir 650, within a proportioning chamber 2305, or within a mixing chamber 2310 (see FIG. 23) that is in fluid communication with the proportioning chamber and the reservoir). Mixture of the diluting fluid and the concentrated fluid forms the composite fluid which may then be dispensed from the container 1800. For example, in various embodiments, the composite may be dispensed form the container via one of an atomizer, a foaming dispenser, a drip dispenser, a pour spout, or a suction-based dispenser (e.g., a straw).

Figure 19B:
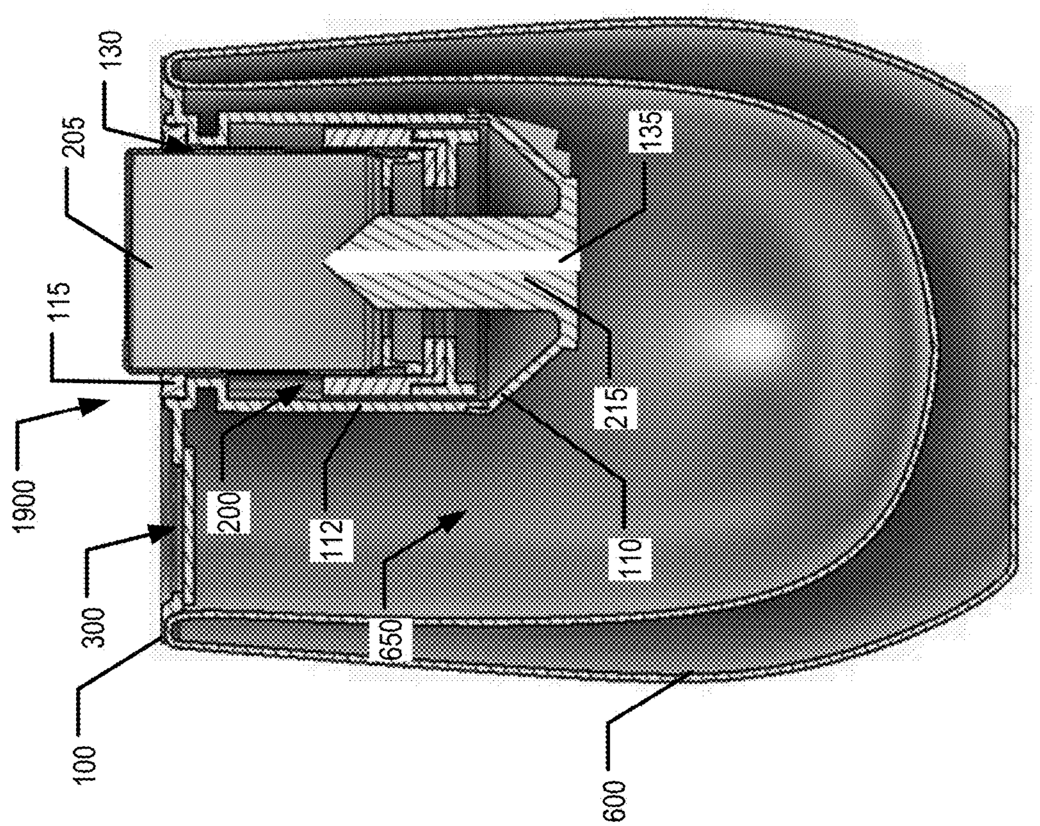
FIGS. 19A-19B illustrate a perspective view and a cross-sectional view, respectively of an example container configured for dispensing a composite fluid that is a potable fluid, according to an example embodiment.
Figure 19A:
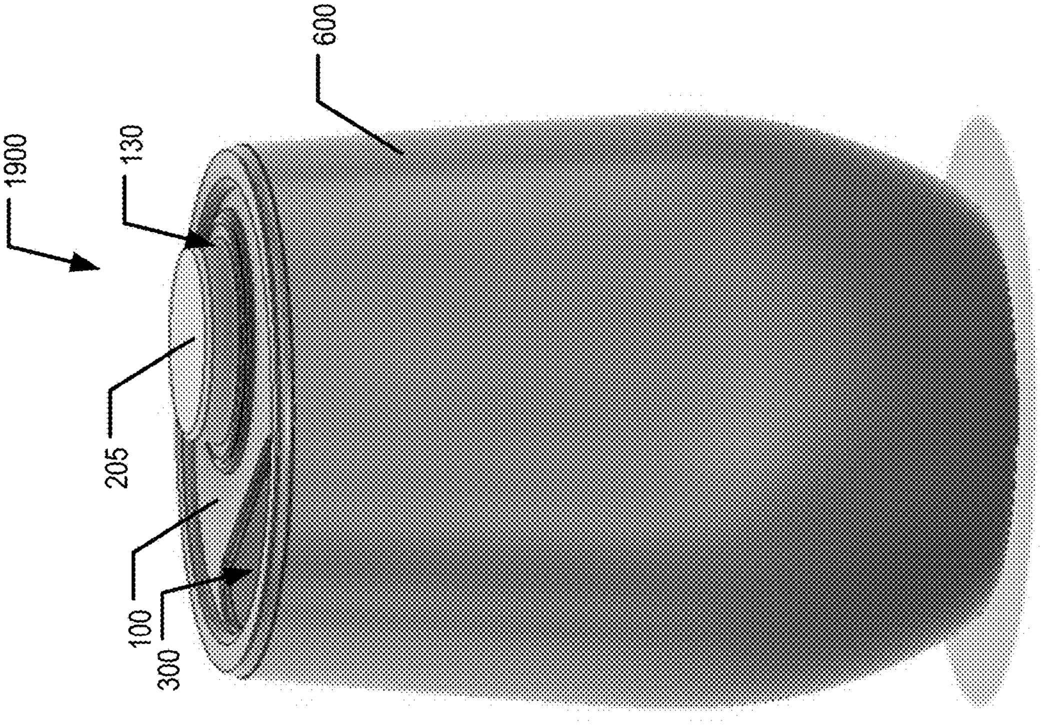

FIGS. 19A and 19B provide a perspective view and a cross-sectional view, respectively, of an example container 1900 having a dispensing mechanism 300 that is a pour spout. For example, the container 1900 is configured for dispensing a potable beverage (e.g., a flavored beverage, beverage including electrolytes, alcoholic beverage, and/or the like). For example, the container 1900 is a covered cup.

The container 1900 includes a cover housing 100 and a base 600. The base 600 houses a reservoir 650 configured for receiving diluting fluid therein. The cover housing 100 includes a chamber 130 housing a retaining-ejecting mechanism 200. The chamber 130 and the retaining-ejecting mechanism 200 are configured for receiving a pod 205 at least partially within the chamber 130. When the pod 205 into an engaged position by the retaining-ejecting mechanism 200, the dispensing surface 206 of the pod 205 is pierced and/or punctured by the puncture tool 215. In various embodiments, the puncture tool 215 is hollow and/or has embedded therein at least a portion of a drain channel 135. For example, the drain channel 135 is configured to provide a fluid path between the chamber 130 and the reservoir 650. For example, the container 1900 is configured such that, when a pod 205 containing concentrated fluid is engaged into the retained position within the chamber 130, the concentrated fluid exits the pod 205 and flows into the reservoir 650 via the drain channel 135. The concentrated fluid may be mixed with a diluting fluid in the reservoir 650 to provide a composite fluid that may be a potable fluid. For example, a user may drink the composite fluid via the pour spot of the dispensing mechanism 300.

Figure 20B:
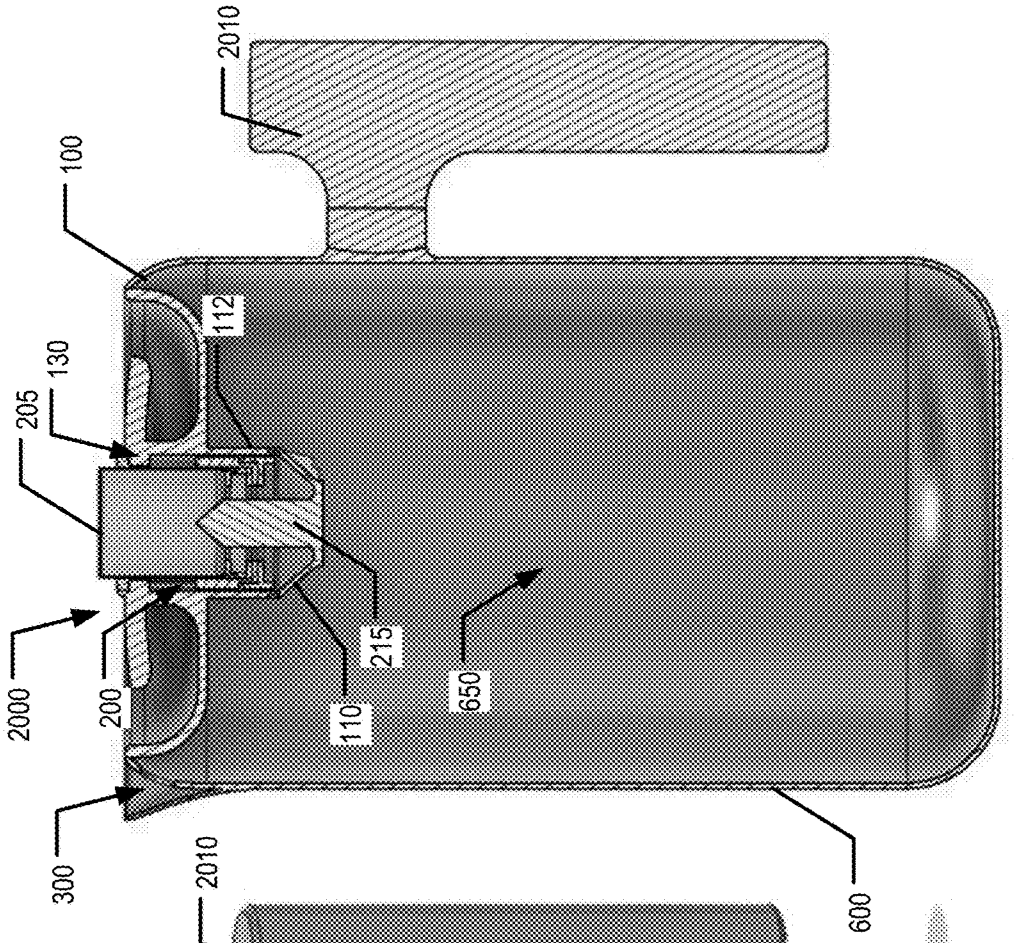
FIGS. 20A-20B illustrate a perspective view and a cross-sectional view, respectively, of another example container configured for dispensing a composite fluid that is a potable fluid, according to an example embodiment.
Figure 20A:
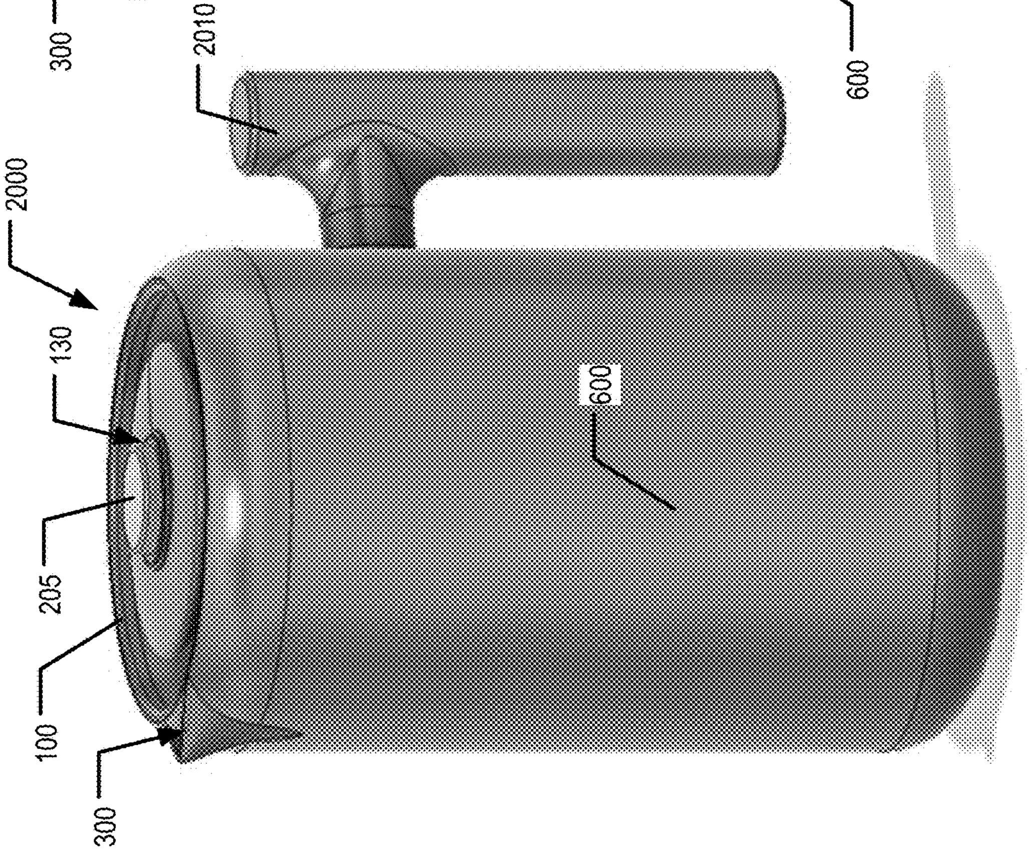

FIGS. 20A and 20B provide a perspective view and a cross-sectional view, respectively, of an example container 2000 having a dispensing mechanism 300 that is a pour spout. For example, the container 2000 is configured for dispensing a potable beverage (e.g., a flavored beverage, beverage including electrolytes, alcoholic beverage, and/or the like). For example, the container 2000 is a pitcher.

The container 2000 includes a cover housing 100 and a base 600. The base 600 houses a reservoir 650 configured for receiving diluting fluid therein. The cover housing 100 includes a chamber 130 housing a retaining-ejecting mechanism 200. The chamber 130 and the retaining-ejecting mechanism 200 are configured for receiving a pod 205 at least partially within the chamber 130. When the pod 205 into an engaged position by the retaining-ejecting mechanism 200, the dispensing surface 206 of the pod 205 is pierced and/or punctured by the puncture tool 215. In various embodiments, the puncture tool 215 is hollow and/or has embedded therein at least a portion of a drain channel 135. For example, the drain channel 135 is configured to provide a fluid path between the chamber 130 and the reservoir 650. For example, the container 2000 is configured such that, when a pod 205 containing concentrated fluid is engaged into the retained position within the chamber 130, the concentrated fluid exits the pod 205 and flows into the reservoir 650 via the drain channel 135. The concentrated fluid may be mixed with a diluting fluid in the reservoir 650 to provide a composite fluid that may be a potable fluid. For example, a user may pour the composite fluid via the pour spot of the dispensing mechanism 300 into a glass, cup, or other drinking vessel. For example, the container 2000 includes a handle 2010 and a user may hold the container 2000 by the handle 2010 while dispensing composite fluid from the container 2000 via the pour spout dispensing mechanism 300.

Figure 21A:
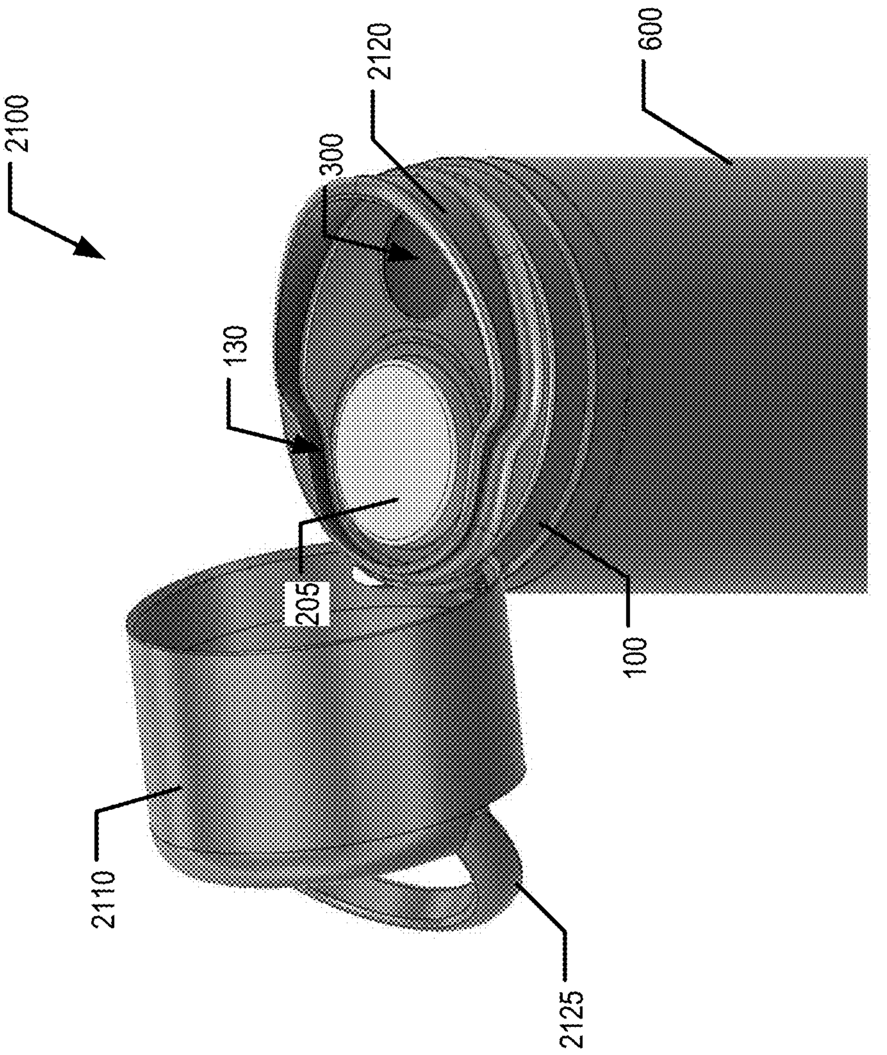
FIGS. 21A-21B illustrate a perspective view and a cross-sectional view, respectively, of another example container configured for dispensing a composite fluid that is a potable fluid, according to an example embodiment.
Figure 21B:
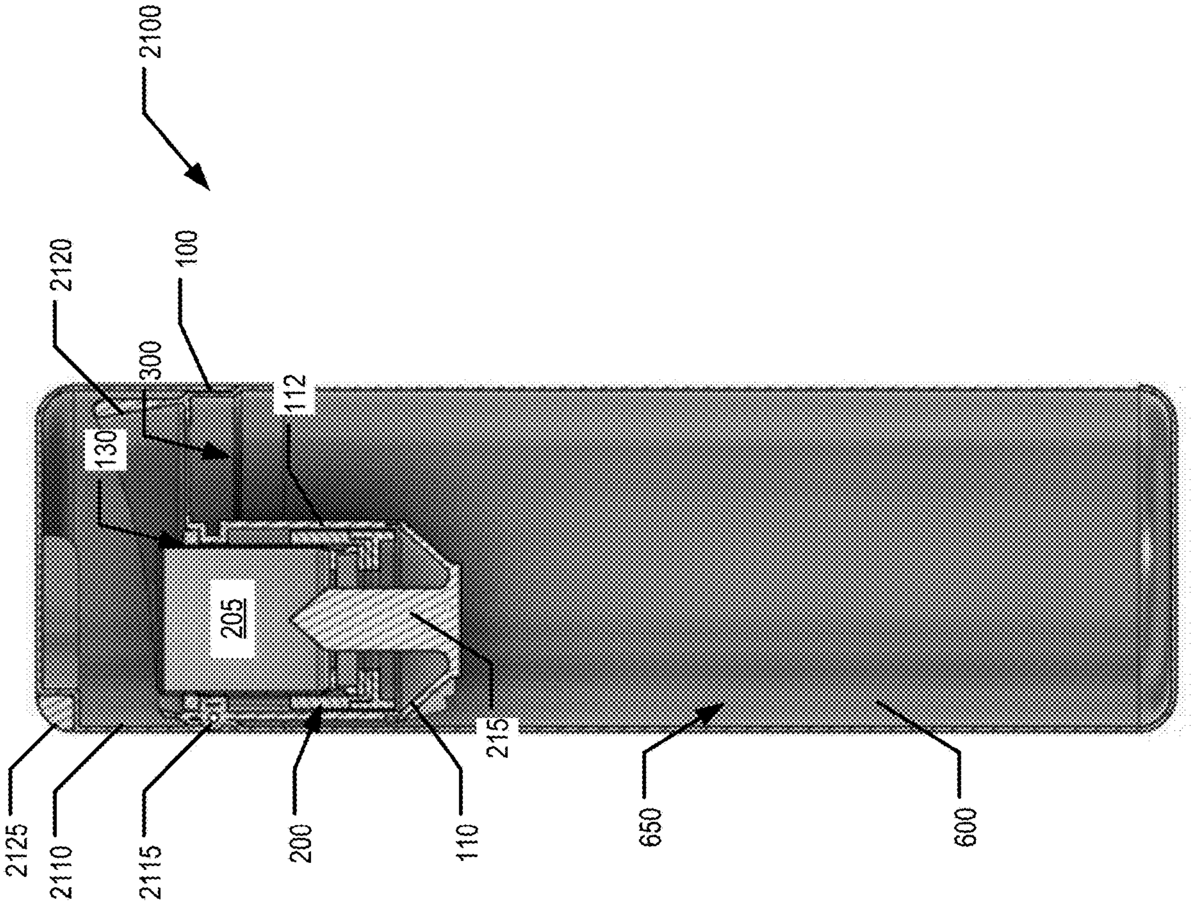

FIGS. 21A and 21B provide a perspective view and a cross-sectional view, respectively, of an example container 2100 having a dispensing mechanism 300 that is a pour spout. For example, the container 2100 is configured for dispensing a potable beverage (e.g., a flavored beverage, beverage including electrolytes, alcoholic beverage, and/or the like). For example, the container 2100 is a drinking bottle.

The container 2100 includes a cover housing 100 and a base 600. The base 600 houses a reservoir 650 configured for receiving diluting fluid therein. The cover housing 100 includes a lid portion 2120 a cap portion 2110. In various embodiments, the lid portion 2120 is configured to enclose the reservoir 650 within the base 600 and includes a chamber 130 housing a retaining-ejecting mechanism 200 and the dispensing mechanism 300. The cap portion 2110 is configured to cover and/or seal the dispensing mechanism 300 (when the cap portion 2110 is in a closed position) and enables a user to drink composite fluid via the dispensing mechanism 300 when the cap portion 2110 in an open position (as shown). A hinge 2115 enables the cap portion 2110 to move between the closed position (as shown in FIG. 21B) and the open position (as shown in FIG. 21A). In various embodiments, the container 2100 may include a flip cap as illustrated, a slide closure, plug, and/or other closure mechanism configured to fluidly seal the reservoir within the container. In an example embodiment, the cap portion 2110 includes a handle 2125. In an example embodiment, the dispensing mechanism 300 includes a straw the extends down into the reservoir 650 such that a user may suck composite fluid out of the reservoir 650 via the straw.

In various embodiments, the chamber 130 and the retaining-ejecting mechanism 200 are configured for receiving a pod 205 at least partially within the chamber 130. When the pod 205 into an engaged position by the retaining-ejecting mechanism 200, the dispensing surface 206 of the pod 205 is pierced and/or punctured by the puncture tool 215. In various embodiments, the puncture tool 215 is hollow and/or has embedded therein at least a portion of a drain channel 135. For example, the drain channel 135 is configured to provide a fluid path between the chamber 130 and the reservoir 650. For example, the container 2100 is configured such that, when a pod 205 containing concentrated fluid is engaged into the retained position within the chamber 130, the concentrated fluid exits the pod 205 and flows into the reservoir 650 via the drain channel 135. The concentrated fluid may be mixed with a diluting fluid in the reservoir 650 to provide a composite fluid that may be a potable fluid.

As disclosed herein, in various embodiments, the dispensing surface 206 of the pod 205 is pierced when the pod 205 is engaged into a retained position within the chamber 130 of the cover housing 100 of a container. The piercing of the pod 205 causes the entire contents of concentrated fluid contained within the pod 205 is released from the pod 205. The concentrated fluid is provided into the reservoir 650 (e.g., via a drain channel 135). The concentrated fluid is then mixed with a diluting fluid (e.g., water or another fluid) within the reservoir 650 to form the composite fluid within the reservoir 650. The composite fluid is then dispensed from the reservoir 650 via the dispensing mechanism 300.

Figure 21C:
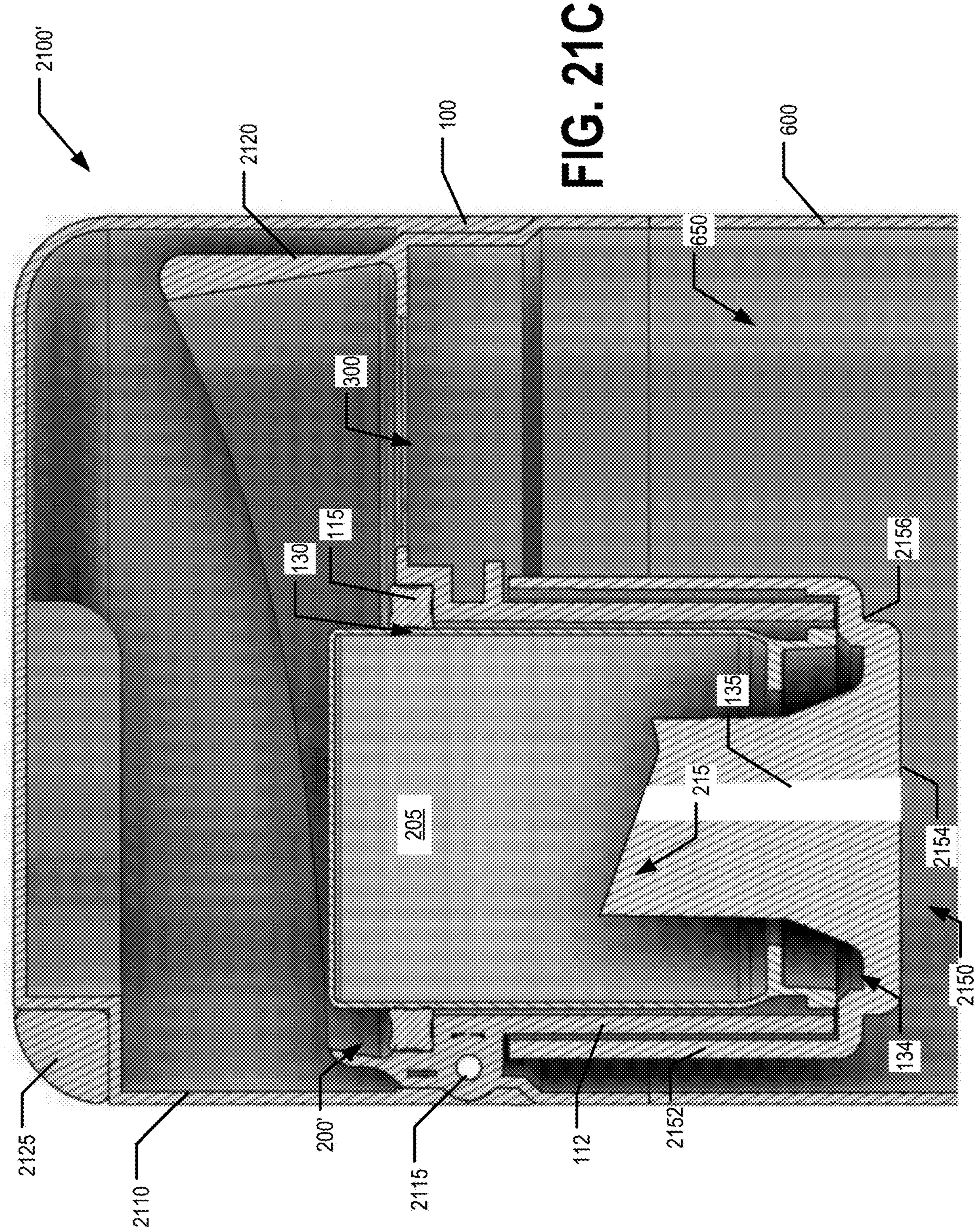
FIG. 21C illustrates a partial cross-sectional view of an alternative container illustrated in FIG. 21A, according to an example embodiment.

FIG. 21C provides a partial cross-sectional view of an example container 2100' that is similar to container 2100. For example, the container 2100' includes a cover housing 100 and a base 600. The base 600 houses a reservoir 650 configured for receiving and maintaining diluting fluid therein. The cover housing 100 includes a lid portion 2120 a cap portion 2110. In various embodiments, the lid portion 2120 is configured to enclose the reservoir 650 within the base 600 and includes a chamber 130 housing a retaining-ejecting mechanism 200' and the dispensing mechanism 300. The cap portion 2110 is configured to cover and/or seal the dispensing mechanism 300 (when the cap portion 2110 is in a closed position) and enables a user to drink composite fluid via the dispensing mechanism 300 when the cap portion 2110 in an open position (as shown). A hinge 2115 enables the cap portion 2110 to move between the closed position (as shown in FIG. 21C) and the open position (as shown in FIG. 21A). In an example embodiment, the cap portion 2110 includes a handle 2125. In an example embodiment, the dispensing mechanism 300 includes a straw the extends down into the reservoir 650 such that a user may suck composite fluid out of the reservoir 650 via the straw.

In various embodiments, the chamber 130 and the retaining-ejecting mechanism 200' are configured for receiving a pod 205 at least partially within the chamber 130. When the pod 205 into an engaged position by the retaining-ejecting mechanism 200, the dispensing surface 206 of the pod 205 is pierced and/or punctured by the puncture tool 215. In various embodiments, the puncture tool 215 is hollow and/or has embedded therein at least a portion of a drain channel 135. For example, the drain channel 135 is configured to provide a fluid path between the chamber 130 and the reservoir 650. For example, the container 2100' is configured such that, when a pod 205 containing concentrated fluid is engaged into the retained position within the chamber 130, the concentrated fluid exits the pod 205 and flows into the reservoir 650 via the drain channel 135. The concentrated fluid may be mixed with a diluting fluid in the reservoir 650 to provide a composite fluid that may be a potable fluid.

The retaining-ejecting mechanism 200' includes sidewall 112. The inner surface of the sidewall 112 acts as the insert guide 225 so as to assist translation of the inserted pod 205 along a unidirectional path in or out of the recess and/or chamber 130. At the top of the sidewall 112, a fluid seal 115 acts as a wiper seal to prevent leakage of diluting fluid, concentrated fluid, and/or composite fluid out of the container 2100' through the chamber 130.

The lower chamber wall 110 of the retaining-ejecting mechanism 200 is replaced by a resilient chamber enclosure 2150 of the retaining-ejecting mechanism 200'. In various embodiments, the resilient chamber enclosure 2150 includes an enclosing portion 2154 and extending portion 2152 that extend outward from the edges of the enclosing portion 2154. The enclosing portion 2154 encloses a bottom opening 134 of the chamber 130. The enclosing portion 2154 and the extending portion 2152 meet at a bent portion 2156. The extending portion 2152 extends from a proximate end that is directly attached to the bent portion 2156 to a distal end that is mechanically coupled to an outer surface of the sidewall 112.

In various embodiments, the resilient chamber enclosure 2150 is formed of a resilient and/or elastic material. In various embodiments, when the pod 205 is pressed into the chamber 130, the pod 205 is engaged by the puncture tool 215 and a portion of the dispensing surface 206 of the pod 205 is seated against the bent portion 2156. The friction between the pod 205 and the fluid seal 115 acts, at least in part, to retain the pod 205 with the chamber 130. When the pod 205 is in the retained position and is then pressed further into the chamber, the resilience and/or elasticity of the resilient chamber enclosure 2150 and/or the contouring of the bent portion 2156 causes, when a user stops pressing the pod 205, the pod 205 to be ejected from the chamber 130. For example, the backaction force experienced by the pod 205 as a result of a user ceasing to push on the pod 205 overcomes, at least in part, the retaining force maintaining the pod 205 within the retained position.

When the pod 205 is engaged with the pod opening mechanism 117 (e.g., puncture tool 215), concentrated fluid exits the pod 205 through the drain channel 135. The concentrated fluid is provided to the reservoir 650 via the drain channel 135 so as to form the composite fluid when mixed with diluting fluid within the reservoir 650.

As disclosed herein, in various embodiments, the dispensing surface 206 of the pod 205 is pierced when the pod 205 is engaged into a retained position within the chamber 130 of the cover housing 100 of a container. The piercing of the pod 205 causes the entire contents of concentrated fluid contained within the pod 205 is released from the pod 205. The concentrated fluid is provided into the reservoir 650 (e.g., via a drain channel 135). The concentrated fluid is then mixed with a diluting fluid (e.g., water or another fluid) within the reservoir 650 to form the composite fluid within the reservoir 650. The composite fluid is then dispensed from the reservoir 650 via the dispensing mechanism 300.

Figure 22B:
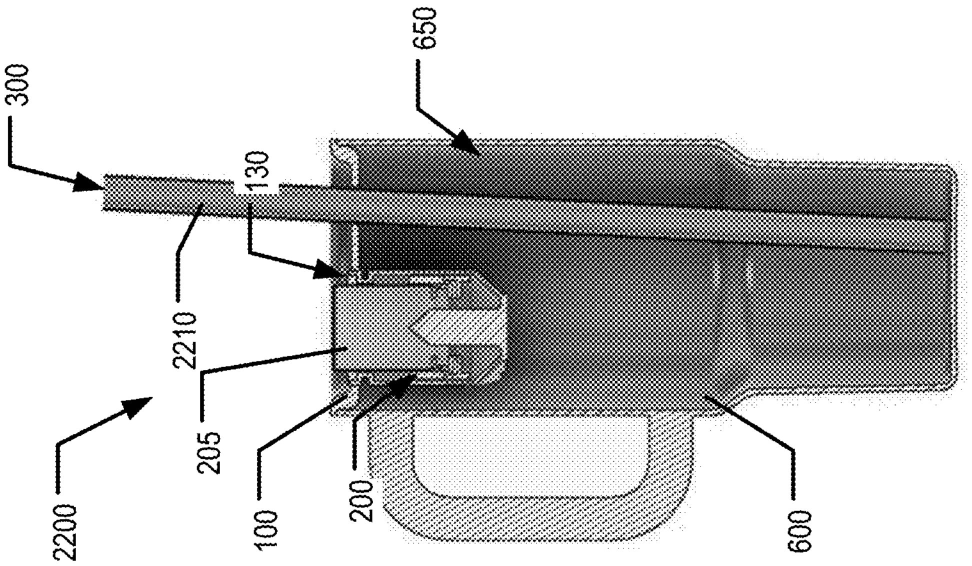
FIGS. 22A-22B illustrate a perspective view and a cross-sectional view, respectively, of another example container configured for dispensing a composite fluid that is a potable fluid, according to an example embodiment.
Figure 22A:
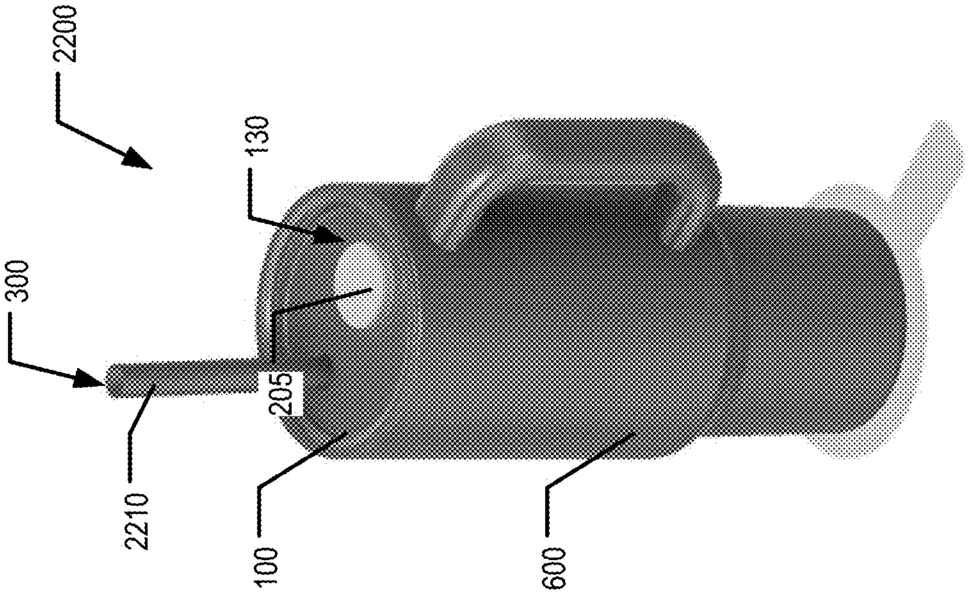

FIGS. 22A-22B provide a perspective view and a cross-sectional view, respectively, of an example container 2200 having a dispensing mechanism 300 that includes a straw 2210. For example, the container 2200 is configured for dispensing a potable beverage (e.g., a flavored beverage, beverage including electrolytes, alcoholic beverage, and/or the like). For example, the container 2200 is a travel cup.

The container 2200 includes a cover housing 100 and a base 600. The base 600 houses a reservoir 650 configured for receiving diluting fluid therein. The cover housing 100 is configured to enclose the reservoir 650 within the base 600 and includes a chamber 130 housing a retaining-ejecting mechanism 200 and the dispensing mechanism 300. In an example embodiment, the dispensing mechanism 300 includes a straw 2210 the extends down into the reservoir 650 such that a user may suck composite fluid out of the reservoir 650 via the straw.

In various embodiments, the chamber 130 and the retaining-ejecting mechanism 200 are configured for receiving a pod 205 at least partially within the chamber 130. When the pod 205 into an engaged position by the retaining-ejecting mechanism 200, the dispensing surface 206 of the pod 205 is pierced and/or punctured by the puncture tool 215. In various embodiments, the puncture tool 215 is hollow and/or has embedded therein at least a portion of a drain channel 135. For example, the drain channel 135 is configured to provide a fluid path between the chamber 130 and the reservoir 650. For example, the container 2200 is configured such that, when a pod 205 containing concentrated fluid is engaged into the retained position within the chamber 130, the concentrated fluid exits the pod 205 and flows into the reservoir 650 via the drain channel 135. The concentrated fluid may be mixed with a diluting fluid in the reservoir 650 to provide a composite fluid that may be a potable fluid.

Figure 23:
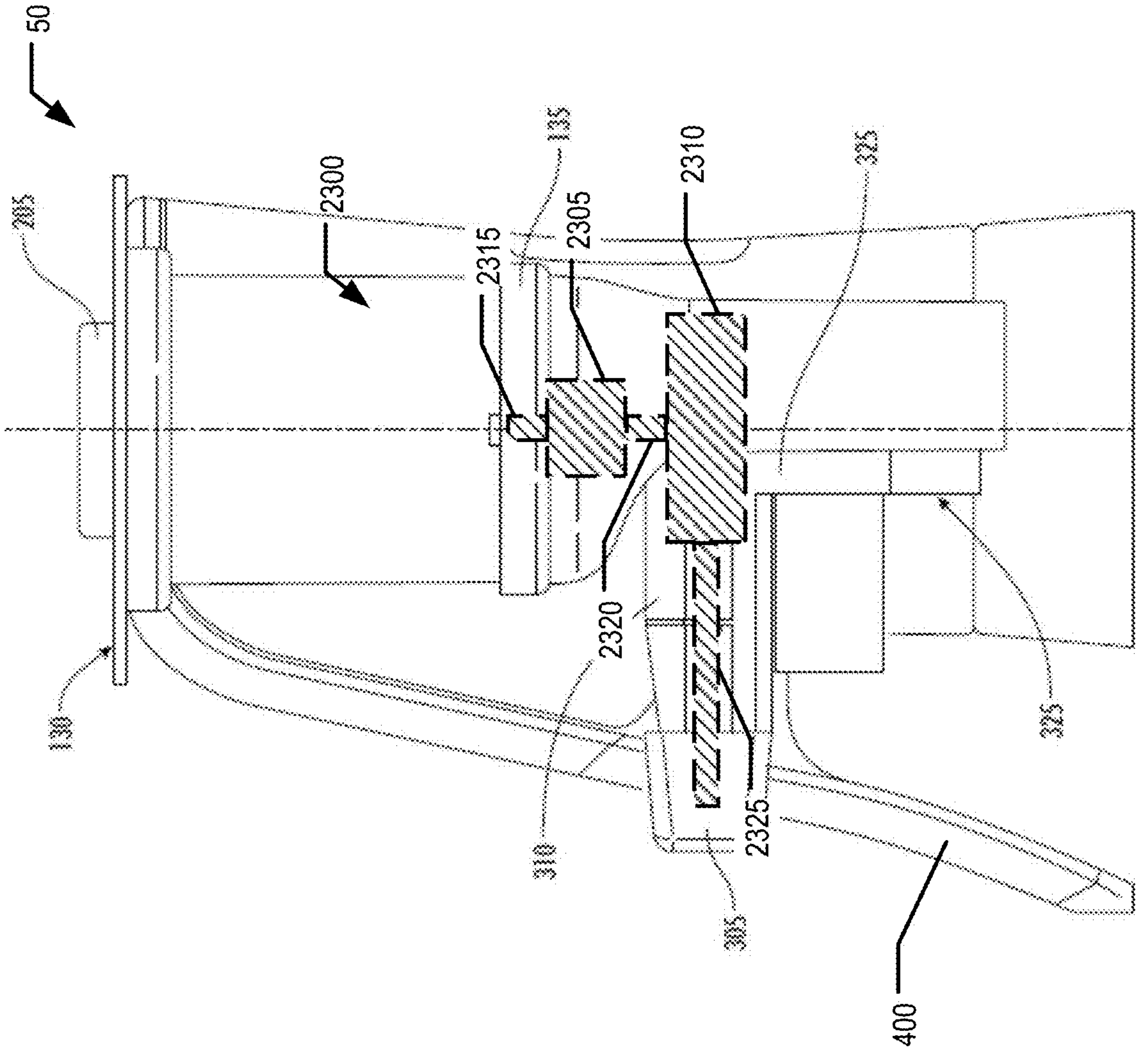
FIG. 23 illustrates an example cover housing of a container including a proportioning system, in accordance with an example embodiment.

In various embodiments, such as the example embodiment illustrated in FIG. 23, when the pod 205 is engaged into the retained position (e.g., by the retaining-ejecting mechanism 200) within the chamber 130, the piercing of the pod 205 does not release all of the contents of the pod 205. Rather, the concentrated fluid is proportioned out of the pod 205. For example, individual doses of the concentrated fluid are released from, suctioned out of, and/or pumped out of the pod 205. For example, in an example embodiment, individual doses of concentrated fluid may be mixed with diluting fluid in an on-demand manner to provide individual dispensations of composite fluid.

For example, in an example embodiment, a container includes a proportioning system 2300. In the illustrated embodiment, the proportioning system 2300 is disposed within the cover housing 100. In an example embodiment, the proportioning system 2300 is disposed at least in part within the base 600. In an example embodiment, the proportioning system 2300 includes a proportioning chamber 2305 configured to control an amount or volume of concentrated fluid that is released from, suctioned out of, and/or pumped out of the pod 205 at a time. In an example embodiment, the proportioning system 2300 includes a mixing chamber 2310, In various embodiments, the mixing chamber 2310 is configured to receive the controlled amount or volume of concentrated fluid therein and a controlled amount or volume of diluting fluid therein. For example, a controlled amount or volume of concentrated fluid therein and a controlled amount or volume of diluting fluid are mixed within the mixing chamber 2310 to form an individual dispensation's worth of composite fluid.

For example, rather than including a drain channel 135 that provides the concentrated fluid into the reservoir 650, the container including the proportioning system includes a drain channel 2315 that provides a fluid path from a pod 205 maintained within a retained position within the chamber 130 to the proportioning chamber 2305. The proportioning system 2300 further includes an inter-chamber pipette or other fluid channel 2320 that enables fluid communication between the proportioning chamber 2305 and the mixing chamber 2310. In an example embodiment, the proportioning system 2300 further includes a dispensing pipette or fluid channel 2325. In an example embodiment, the dispensing pipette or fluid channel 2325 enables fluid communication between the mixing chamber 2310 and a dispensing mechanism 300 of the container (e.g., nozzle 305).

For example, in the illustrated embodiment of FIG. 23, when the trigger mechanism 400 is activated, a vacuum pressure is generated that causes concentrated fluid from the pod 205 to be pulled into the mixing chamber 2310 via the proportioning chamber 2305 and that causes diluting fluid to be pulled into the mixing chamber 2310. In various embodiments, the proportioning chamber 2305 is shaped and/or sized to control the negative vacuum pressure experienced by the concentrated fluid within the pod 205 such that a controlled amount and/or volume of concentrated fluid is provided to the mixing chamber 2310 via the proportioning chamber 2305. In various embodiments, the size of the mixing chamber 2310 is configured to cause a controlled amount and/or volume of diluting fluid to be provided to the mixing chamber 2310 such that composite fluid of a particular strength (e.g., a particular ratio of concentrated fluid to diluting fluid in the composite fluid) is formed. In an example embodiment, the cover housing 100 may include a user interface and/or user selection element such as a dial, switch, and/or the like such that the user may interact with the user interface and/or interaction element to modify and/or control the controlled amount and/or volume of concentrated fluid and/or controlled amount and/or volume of diluting fluid such that the user may control the strength of the composite fluid (e.g., the ratio of concentrated fluid to diluting fluid in the composite fluid). The on-demand mixed composite fluid may then be provided to the nozzle 305 such that the on-demand mixed composite fluid is dispensed from the container.

In an example embodiment, rather than suctioning or pumping the concentrated fluid out of the pod 205 for each dispensing event (e.g., each individual activation of the trigger mechanism 400, suction being applied to the dispensing mechanism 300, and/or the like), the entire contents of the pod 205 are released into the proportioning chamber 2305. A controlled amount and/or volume of the concentrated fluid may then be suctioned and/or pumped from the proportioning chamber 2305 to the mixing chamber 2310 for a dispensing event (e.g., an activation of the trigger mechanism 400, suction being applied to the dispensing mechanism 300, and/or the like).

In various embodiments, the proportioning system 2300 is configured for use with various types of dispensing mechanisms 300, such as atomizer, pump dispensers, pour spouts, foaming dispensers, suction-based dispensers (e.g., a straw), and/or the like.

Figure 24B:
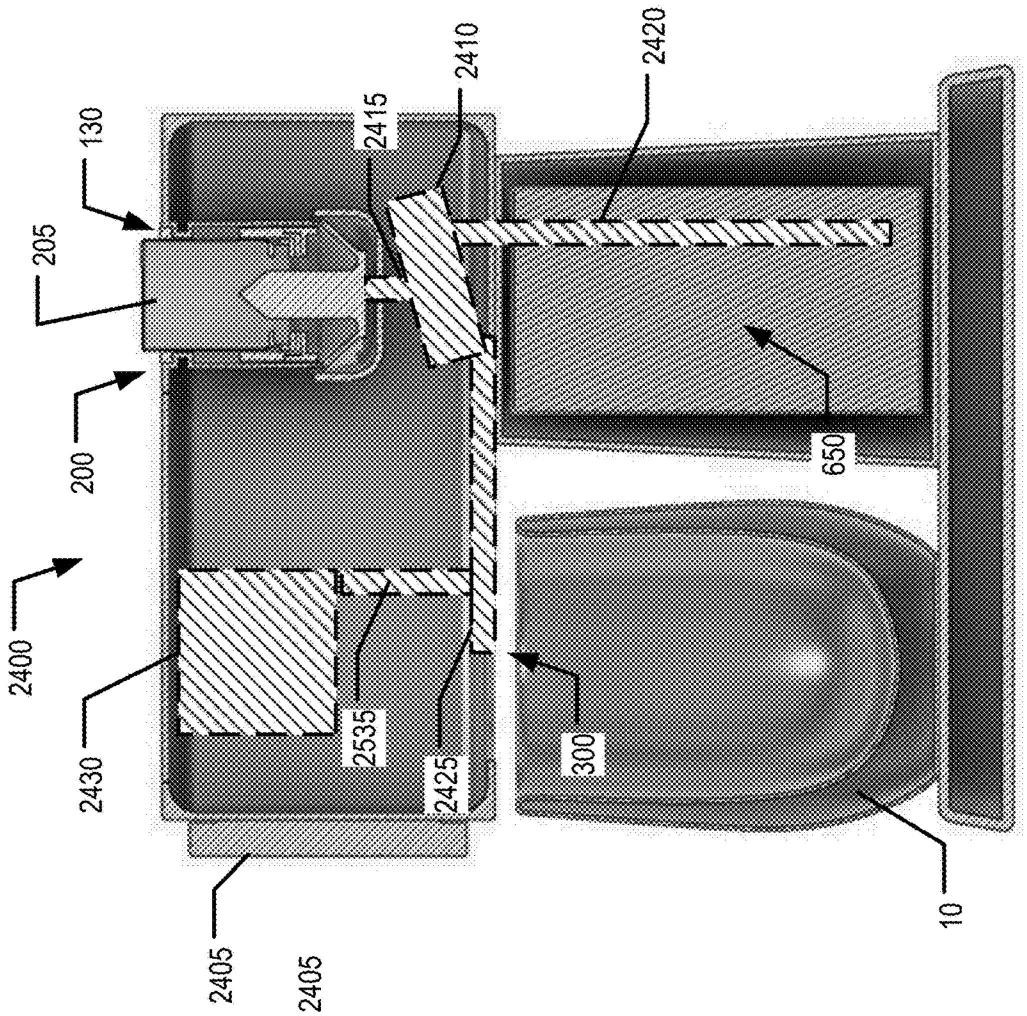
FIGS. 24A-24B illustrate a perspective view and a cross-section view, respectively of another example container configured for dispensing a composite fluid that is a potable fluid, according to an example embodiment.
Figure 24A:
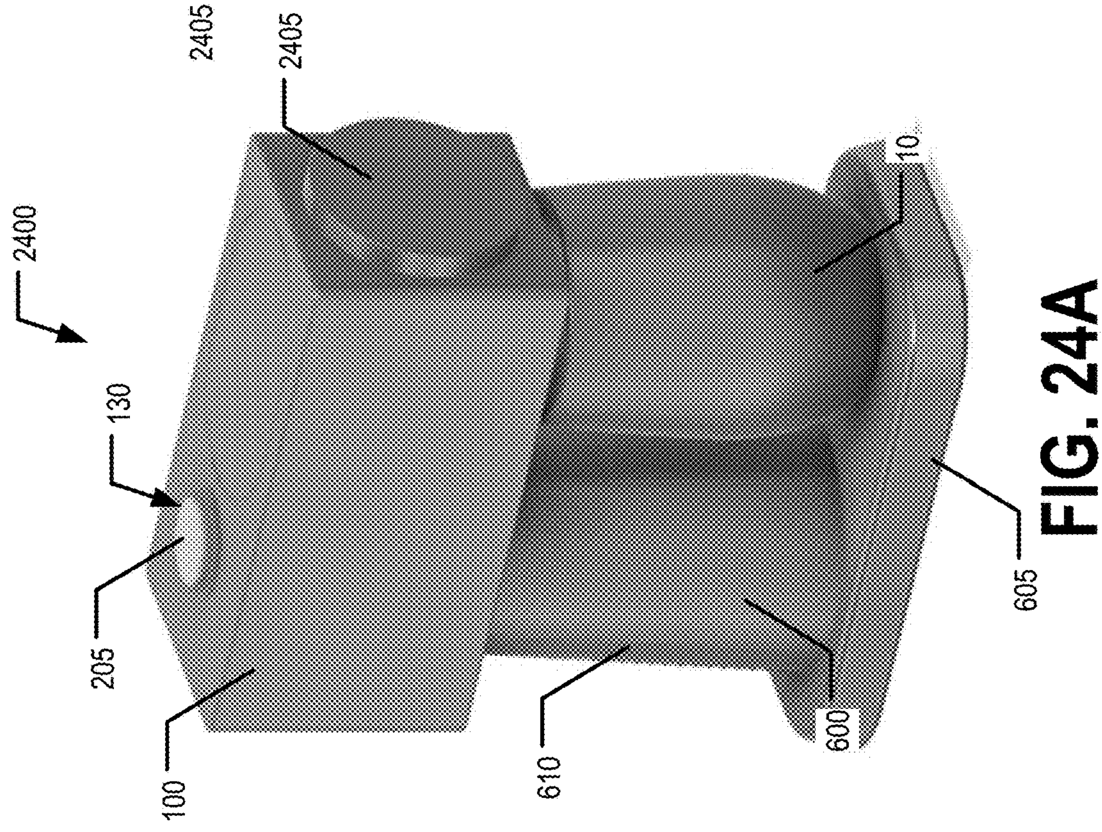

FIGS. 24A-24B provide a perspective view and a cross-sectional view of an example container 2400 configured to generate and/or provide single dispensations of composite fluid. In various embodiments, the composite fluid may be flat/still, carbonated, and/or nitrogenated. In various embodiments, the composite fluid may be chilled, heated, or room/ambient temperature.

The container 2400 comprises a cover housing 100 and a base 600. The base 600 includes a support portion 605 and an upright portion 610. In various embodiments the support portion 605 is configured to rest on a horizontal surface and the upright portion 610 is configured to extend outward (e.g., upward) from the support portion 605. In various embodiments, the base 600 houses a reservoir 650 configured to receive and hold diluting fluid. In an example embodiment, the base 600 further comprises a heating element configured to heat at least a portion of the diluting fluid within the reservoir 650. In an example embodiment, the base 600 further comprises a cooling element configured to chill at least a portion of the diluting fluid within the reservoir 650.

In the illustrated embodiment, the reservoir 650 is disposed within the upright portion 610 of the base 600. In an example embodiment, the support portion 605 includes a location for positioning a receiving vessel 10, such as a cup or glass, for receiving composite fluid dispensed from the container 2400. In another example embodiment, the container 2400 is configured to dispense (possibly carbonated or nitrogenated, possibly heated or chilled) composite fluid for direct consumption by a user (e.g., without the use of an intermediate receiving vessel 10).

In various embodiments, the cover housing 100 includes a chamber 130 configured to receive at least a portion of a pod 205 therein. The cover housing 100 may further includes a user interface 2405 configured to receive user input. For example, the user may interact with the user interface 2405 to control a volume of composite fluid dispensed during a single dispensation; whether and/or a degree to which the dispensed composite fluid is carbonated, nitrogenated, heated, and/or chilled; and/or the like.

In the illustrated embodiment, the cover housing 100 houses the chamber 130 having a retaining-ejecting mechanism 200 disposed therein. A drain channel 2415 provides the concentrated fluid from the pod 205 to a mixing chamber 2410. A diluting fluid channel 2420 is configured for pumping diluting fluid from the reservoir 650 into the mixing chamber 2410 such that a composite fluid is formed in the mixing chamber 2410. In an example embodiment, the amount and/or volume of diluting fluid pumped from the reservoir 650 int the mixing chamber 2410 is determined based on user interaction with the user interface 2405. The composite fluid is then dispensed from the mixing chamber 2410 via a dispensing channel 2425 that is coupled to the dispensing mechanism 300. For example, the dispensing channel 2425 is configured to provide fluid communication between the mixing chamber 2410 and the dispensing mechanism 300.

In an example embodiment, the cover housing 100 further comprises a compressed gas cartridge housing 2430 configured to have a compressed gas cartridge coupled therein. For example, the compressed gas cartridge housing 2430 may be configured to contain a compressed gas cartridge that contains a gas such as carbon dioxide or nitrogen which may then be used to carbonate or nitrogenate composite fluids. For example, gas tube 2435 may provide a gas, such as carbon dioxide or nitrogen, from a compressed gas cartridge coupled into the compressed gas cartridge housing 2430 to the fluid path of the composite fluid (e.g., to the mixing chamber 2410, the dispensing channel 2425, and/or the like) such that the composite fluid is carbonated and/or nitrogenated when the composite fluid is dispensed from the container 2400. For example, gas may be dissolved into the composite fluid that is dispensed from the container 2400. In an example embodiment (e.g., in which the composite fluid is not a potable fluid/beverage) the gas may be used to control the dispersal of composite fluid from the dispensing mechanism.

Figure 25A:
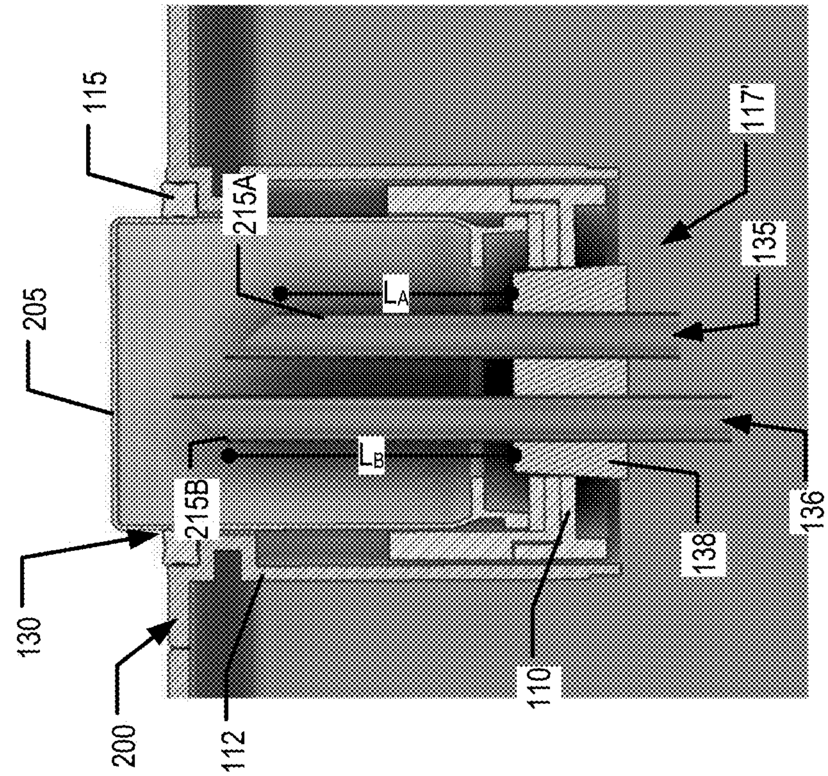
FIGS. 25A-25B each illustrate a cross-section view of other example embodiments of a pod opening mechanism that is part of an example embodiment of a retaining-ejecting mechanism.
Figure 25B:
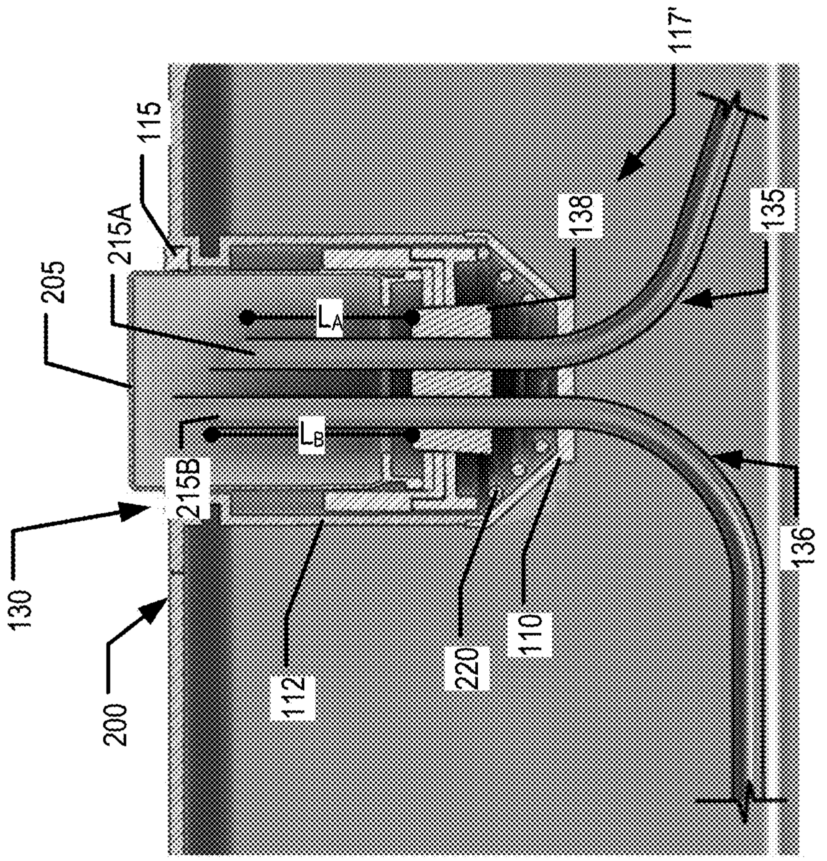

In various embodiments, the pod opening mechanism 117 is illustrated as a single puncture tool 215. In various embodiments, the pod opening mechanism 117 comprises various configurations of multiple puncture tools. For example, FIGS. 25A and 25B each illustrate example embodiments of a pod opening mechanism 117' that includes two puncture tools 215A, 215B. In the illustrated embodiment, a plug 138 is disposed within the chamber end wall 110. The first puncture tool 215A and the second puncture tool 215B extend through the plug 138. The first puncture tool 215A defines at least a portion of the drain channel 135 that provides a fluid path for the concentrated fluid to exit the pod 205 and flow into the reservoir 650, proportioning chamber, or mixing chamber of the container. The second puncture tool 215B defines, at least in part, a vent channel 136 that enables air to enter the pod 205.

In an example embodiment, the vent channel 136 may enable air to enter the pod 205 freely such that the entire contents of the pod 205 are drained at one time. In another example embodiment, the vent channel 136 may be used to pump air into the pod 205 to cause a controlled amount or volume of concentrated fluid to be pumped out of the pod 205. In an example embodiment, the vent channel 136 includes a valve such that a controlled amount or volume of concentrated fluid may be suctioned out of the pod 205 via the drain channel 135 and the valve enables a controlled inlet of air into pod 205 to prevent a vacuum from forming within the pod 205.

In an example embodiment, the second puncture tool 215B, which defines at least in part a vent channel 136, extends further into the chamber 130 than the first puncture tool 215A, which defines at least in part a drain channel 135. For example, the first length L A that the first puncture tool 215A extends into the chamber 130 (e.g., from the surface of the chamber end wall 110 or from the surface of the plug 138) is smaller than the second length L B that the second puncture tool 215B extends into the chamber 130 (e.g., from the surface of the chamber end wall 110 or from the surface of the plug 138).

In various embodiments, the pod opening mechanism 117' may be incorporated into the retaining-ejecting mechanism 200, 200' of various containers, such as containers 50, 1800, 1900, 2000, 2100, 2100', 2200, 2400.

Figure 26:
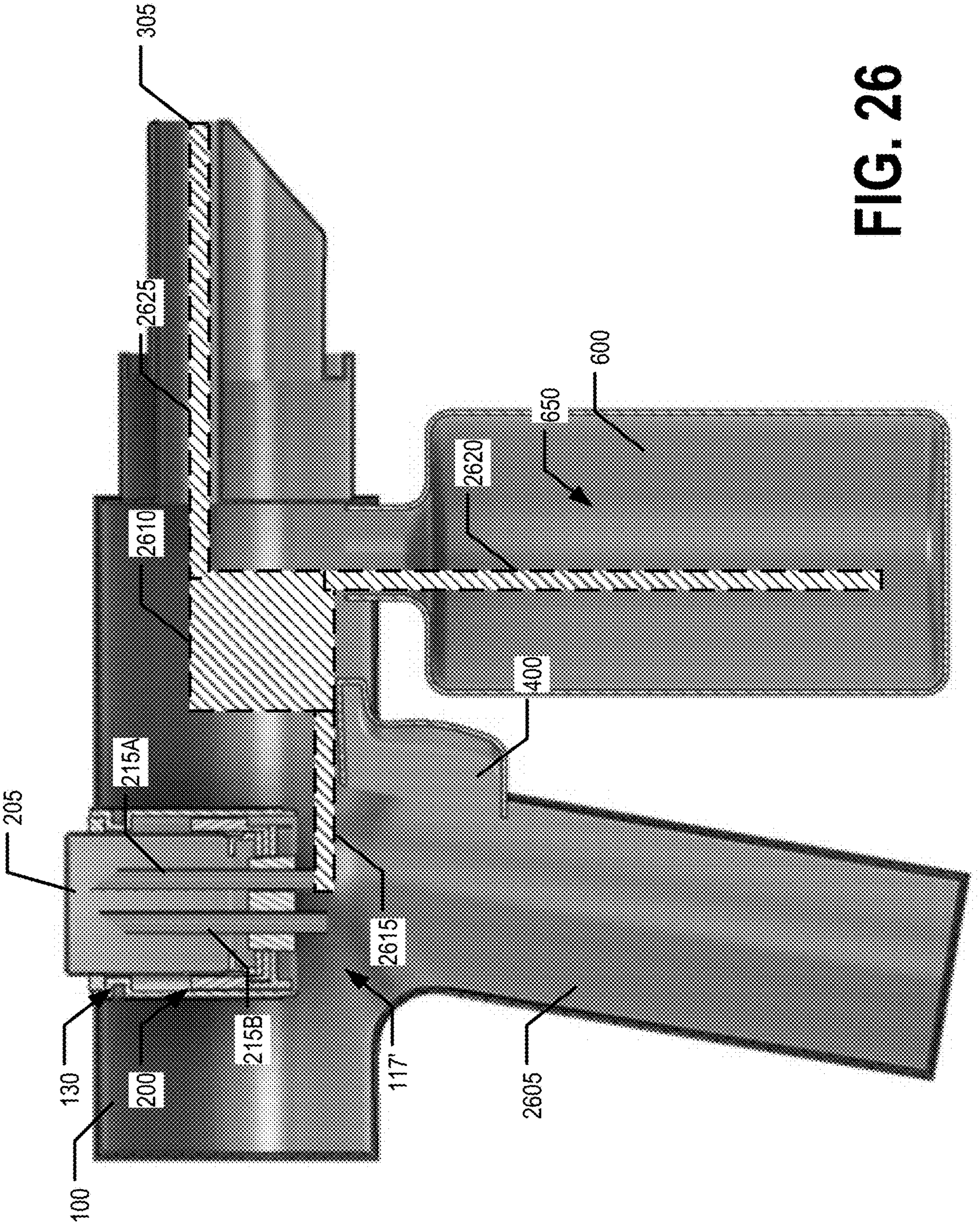
FIG. 26 illustrates a cross-section view of an example container that includes a pod opening mechanism that includes two puncture tools, in accordance with an example embodiment.

FIG. 26 illustrates a cross-sectional view of an example container 2600 that includes a pod opening mechanism 117' having two puncture tools 215A, 215B. The example container 2600 includes a cover housing 100, a base 600 housing a reservoir 650, and a handle portion 2605. In an example embodiment, the container 2600 is configured to sit on a horizontal surface (e.g., table, counter, etc.) on respective ends of the base 600 and handle portion 2605.

The container 2600 includes a mixing chamber 2610 that is in fluid communication with the first puncture tool 215A via drain channel 2615. The mixing chamber 2610 is in fluid communication with the reservoir 650 via a diluting fluid channel 2620. For example, example, upon activation of the trigger mechanism 400, a controlled amount and/or volume of concentrated fluid may be pumped and/or suctioned out of the pod 205 (or a proportioning chamber that is holding the concentrated fluid after the concentrated fluid was released from the pod 205) and into the mixing chamber 2610. Similarly, upon activation of the trigger mechanism 400, a controlled amount and/or volume of the diluting fluid may be pumped and/or suctioned out of the reservoir 650 into the mixing chamber 2610. Composite fluid may therefore be formed in the mixing chamber 2610 and then dispensed via dispensing channel 2625. For example, the dispensing channel may provide the composite fluid to the dispensing mechanism 300. For example, the dispensing mechanism may include a nozzle and/or the like.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A container configured for dispensing a composite fluid, the container comprising:

a cover housing comprising:

a chamber comprising:

a recess configured for receiving a pod at least partially therein, wherein the pod is configured to contain a concentrated fluid, and a retaining-ejecting mechanism, wherein the retaining-ejecting mechanism comprises:

at least one seal, wherein the at least one seal is configured to engage the pod to prevent fluid from at least one of the pod or a base to exit the container undesirably, and an insert guide configured to assist translation of the inserted pod along a unidirectional path in or out of the chamber, wherein the retaining-ejecting mechanism enables the pod to be inserted into a retained position at least partially within the recess, retained in the retained position, and released from the retained position;

the base at least partially defining a reservoir configured for receiving and maintaining a diluting fluid therein, wherein the composite fluid is a mixture of the diluting fluid and the concentrated fluid; and a dispensing mechanism configured for selectively dispensing the composite fluid from the container, wherein the cover housing is configured to be coupled to the base so as to enclose the reservoir, wherein the at least one seal comprises a first seal and a second seal and, when the pod is in the retained position, the first seal is configured to engage the pod to hold the pod seated against the second seal.

2. The container of claim 1 further comprising:

a fluid path between the recess and the reservoir configured to enable the diluting fluid to flow through the recess into the reservoir.

3. The container of claim 1, wherein the chamber further comprises a pod opening mechanism configured to enable at least a portion of the concentrated fluid to flow out of the pod and into one of (a) the reservoir via a fluid path between the recess and the reservoir or (b) a proportioning chamber.

4. The container of claim 3, wherein the diluting fluid and the concentrated fluid are mixed in the one of (a) the reservoir via the fluid path between the recess and the reservoir or (b) the proportioning chamber to form the composite fluid.

5. The container of claim 4, wherein the dispensing mechanism is configured to dispense the composite fluid from the one of (a) the reservoir via a fluid path between the recess and the reservoir or (b) the proportioning chamber.

6. The container of claim 5, wherein the dispensing mechanism is one of an atomizer, a foaming dispenser, a pump dispenser, a drip dispenser, a pour spout, or a suction-based dispenser.

7. The container of claim 3, wherein the pod opening mechanism comprises one or more puncture tools configured to puncture a surface of the pod when the pod is engaged into the retained position.

8. The container of claim 1, wherein the composite fluid is one of a cleaning solution, a potable beverage, a cleaner configured for cleaning humans or other animals, or a medicated fluid.

9. The container of claim 1, wherein a fluid path between the recess and the reservoir is configured to enable the diluting fluid to be provided to the reservoir via the recess without disassembly of the container.

10. The container of claim 9, wherein the base comprises a window that enables a user to see when a level of diluting fluid within the reservoir reaches a fill level.

11. The container of claim 1, further comprising a proportioning system configured to suction or pump a controlled volume of concentrated fluid out of the pod.

12. The container of claim 11, wherein the proportioning system is configured to mix the controlled volume of concentrated fluid with a controlled volume of diluting fluid to provide composite fluid on-demand of a set strength.

13. The container of claim 12, wherein the container includes a user selection element that enables a user to select a ratio of concentrated fluid to the diluting fluid in the composite fluid.

14. The container of claim 12, wherein the composite fluid is dispensed via the dispensing mechanism.

15. The container of claim 11, further comprising a trigger mechanism, wherein the proportioning system is configured to suction or pump the controlled volume of concentrated fluid out of the pod in response to actuation of the trigger mechanism.

16. The container of claim 1, wherein the diluting fluid is water.

17. The container of claim 1, wherein the at least one seal is configured to engage the pod so as to retain the pod within the retained position via friction.

18. The container of claim 1, further comprising a compressed gas cartridge housing configured to have a compressed gas cartridge, wherein the container is configured such that when the composite fluid is dispensed from the container, gas from the compressed gas cartridge is dissolved in the composite fluid.

19. The container of claim 1, wherein at least one of:

the container is configured to be held in a human hand when dispensing the composite fluid, the container is configured to rest on a horizontal surface when dispensing the composite fluid, or the container is configured to be mounted to a vertical surface when dispensing the composite fluid.

* * * * *